United States Patent
Hozumi et al.

(10) Patent No.: US 10,320,260 B2
(45) Date of Patent: Jun. 11, 2019

(54) CANNED MOTOR AND VACUUM PUMP

(71) Applicant: EBARA CORPORATION, Tokyo (JP)

(72) Inventors: Takashi Hozumi, Tokyo (JP); Naoya Yoshida, Tokyo (JP); Yoshinori Ojima, Tokyo (JP); Takanori Inada, Tokyo (JP); Toshiharu Nakazawa, Tokyo (JP); Atsushi Oyama, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 66 days.

(21) Appl. No.: 15/437,197

(22) Filed: Feb. 20, 2017

(65) Prior Publication Data
US 2017/0179783 A1    Jun. 22, 2017

Related U.S. Application Data

(62) Division of application No. 14/858,873, filed on Sep. 18, 2015, now Pat. No. 9,660,496, which is a division
(Continued)

(30) Foreign Application Priority Data

Mar. 29, 2012 (JP) .................................. 2012-077487
Aug. 13, 2012 (JP) .................................. 2012-179328
(Continued)

(51) Int. Cl.
*H02K 5/128* (2006.01)
*F04D 29/60* (2006.01)
(Continued)

(52) U.S. Cl.
CPC ............ *H02K 5/128* (2013.01); *F04D 17/08* (2013.01); *F04D 25/06* (2013.01); *F04D 29/60* (2013.01);
(Continued)

(58) Field of Classification Search
CPC ................ H02K 5/128; H02K 5/1285; H02K 2005/1287; H02K 5/132; H02K 3/18;
(Continued)

(56) References Cited

U.S. PATENT DOCUMENTS 2,654,848 A    10/1953    John
2,730,636 A    1/1956    Dunn
(Continued)

FOREIGN PATENT DOCUMENTS

DE    4129590 A1    3/1993
DE    4205926 A1    9/1993
(Continued)

OTHER PUBLICATIONS

"Coefficient of Linear Thermal Expansion"; http://www.engineeringtoolbox.com/linear-expansion-coefficients-d_95.html; Oct. 26, 2015; accessed Nov. 16, 2015; 6 pages.
(Continued)

*Primary Examiner* — Burton S Mullins
(74) *Attorney, Agent, or Firm* — Baker & Hostetler LLP

(57) ABSTRACT

Provided is a canned motor to be coupled to a vacuum pump and used as a rotary driving source for the vacuum pump. The canned motor includes: a stator core; a rotor provided on an inner side of the stator core; and a non-conductive can provided between the stator core and the rotor. The non-conductive can is configured to separate the stator core and the rotor from each other. The non-conductive can is made of resin, ceramic, or composite material thereof. The non-conductive can is bonded to the stator core with an adhesive.

4 Claims, 19 Drawing Sheets

Related U.S. Application Data of application No. 13/853,005, filed on Mar. 28, 2013, now Pat. No. 9,614,411.

(30) Foreign Application Priority Data

| | | |
|---|---|---|
| Aug. 13, 2012 | (JP) | 2012-179332 |
| Aug. 13, 2012 | (JP) | 2012-179335 |
| Jan. 25, 2013 | (JP) | 2013-012284 |

(51) Int. Cl.

| | |
|---|---|
| *F04D 17/08* | (2006.01) |
| *F04D 25/06* | (2006.01) |
| *H02K 3/18* | (2006.01) |
| *H02K 3/487* | (2006.01) |

(52) U.S. Cl.
CPC ............... *H02K 3/18* (2013.01); *H02K 3/487* (2013.01); *H02K 2005/1287* (2013.01)

(58) Field of Classification Search
CPC ......... H02K 3/487; F04D 25/06; F04D 17/08; F04D 29/60
USPC .......................................................... 310/87
See application file for complete search history.

(56) References Cited

U.S. PATENT DOCUMENTS

| | | |
|---|---|---|
| 3,135,884 A | 6/1964 | Luenberger |
| 3,740,598 A | 6/1973 | Hallerback |
| 4,065,231 A | 12/1977 | Litzenberg |
| 4,492,889 A | 1/1985 | Fukushi et al. |
| 5,065,061 A | 11/1991 | Satoh et al. |
| 5,779,453 A | 7/1998 | Nagayama et al. |
| 5,816,782 A | 10/1998 | Nagayama et al. |
| 6,365,998 B1 | 4/2002 | Kech et al. |
| 6,445,098 B1 | 9/2002 | Materne |
| 6,902,380 B2 | 6/2005 | Ojima et al. |
| 2004/0090137 A1 | 5/2004 | Bildstein |
| 2007/0069841 A1 | 3/2007 | Kusano |
| 2008/0197731 A1* | 8/2008 | Kusano ............... F04B 17/03 310/86 |

FOREIGN PATENT DOCUMENTS

| | | |
|---|---|---|
| DE | 102008026992 A1 | 12/2009 |
| EP | 0530786 A2 | 3/1993 |
| GB | 2201844 A | 9/1988 |
| JP | S48-055308 A | 8/1973 |
| JP | S53-081309 U | 7/1978 |
| JP | S59-096843 A | 6/1984 |
| JP | S61-231848 | 10/1986 |
| JP | H03-007671 U | 1/1991 |
| JP | H05-223098 | 8/1993 |
| JP | H06-052354 U | 7/1994 |
| JP | H06-200895 A | 7/1994 |
| JP | 08-266013 A | 10/1996 |
| JP | H08-319967 A | 12/1996 |
| JP | H10-052002 | 2/1998 |
| JP | H11-089158 | 3/1999 |
| JP | 2003-153494 | 5/2003 |
| JP | 2005-184958 | 7/2005 |
| JP | 2005-184958 A | 7/2005 |
| JP | 2007-049866 A | 2/2007 |
| JP | 2007-151210 A | 6/2007 |
| JP | 2008-101633 A | 5/2008 |
| JP | 2009-201294 A | 9/2009 |
| JP | 2011-101594 | 5/2011 |
| JP | 2011-127484 A | 6/2011 |
| JP | 2011-166944 A | 8/2011 |
| WO | WO 2007/098976 A2 | 9/2007 |
| WO | WO 2011/099603 A1 | 8/2011 |

OTHER PUBLICATIONS

JPO IPDL English machine translation, JP2003-153494; Kojima et al.; May 2003.

European Patent Application No. 13001615.7; Extended Search Report; dated Aug. 23, 2017; 9 pages.

* cited by examiner

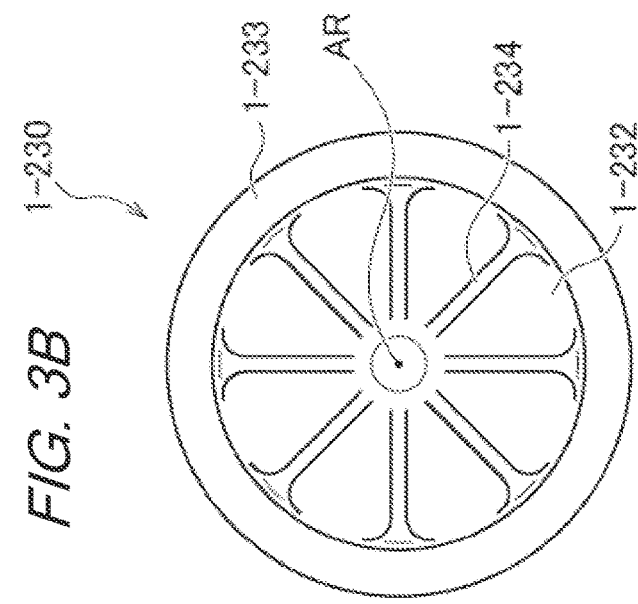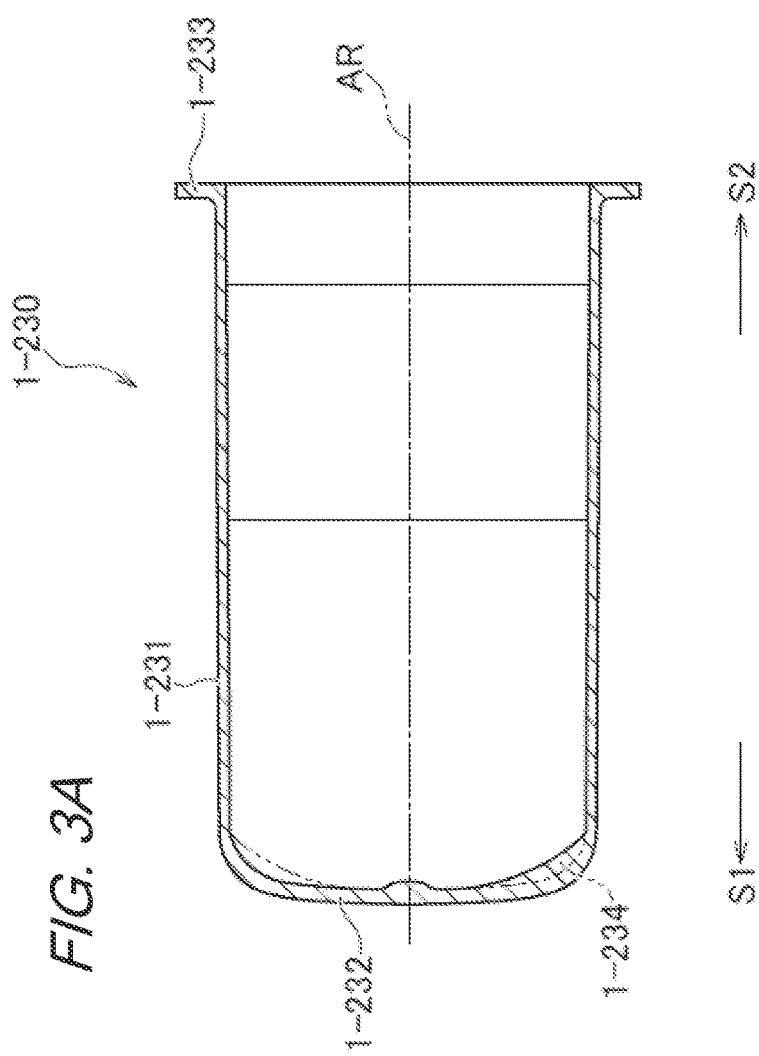

CANNED MOTOR AND VACUUM PUMP

CROSS-REFERENCE TO RELATED APPLICATIONS

This document is a Divisional Application of U.S. application Ser. No. 14/858,873, filed on Sep. 18, 2015, which is a Divisional Application of Ser. No. 13/853,005 filed Mar. 28, 2013, which claims priority to Japanese Patent Application Nos. 2013-012284 filed on Jan. 25, 2013, 2012-179328 filed on Aug. 13, 2012, 2012-179332 filed on Aug. 13, 2012, 2012-179335 filed on Aug. 13, 2012 and 2012-077487 filed on Mar. 29, 2012, the entire contents of which are hereby incorporated by reference.

TECHNICAL FIELD

The present invention relates to a canned motor.

BACKGROUND ART

A vacuum pump including a motor, which is described in, for example, JP2005-184958A, is conventionally known. The above-mentioned vacuum pump is widely used to exhaust a process gas in a vacuum chamber during semiconductor manufacturing steps.

In the motor for the vacuum pump described above, a rotor chamber for separating a motor stator and a motor rotor is formed so as to seal the vacuum pump. The rotor chamber is a space which is hermetically sealed with respect to the motor stator by a partition, that is, a can fixed to the vacuum pump side. The motor having a structure in which the motor stator and the motor rotor are separated from each other by the can as described above is referred to as a canned motor. The canned motor is generally provided to an end portion of a pump rotor of the vacuum pump so as to be directly coupled to the pump rotor.

For the canned motor described above, a can made of non-magnetic metal such as stainless steel with a small thickness has been conventionally used. When the can made of non-magnetic metal is used, however, an eddy current is generated in a surface under the effect of a magnetic flux from the motor stator. By a loss generated by the generation of the eddy current, motor efficiency is lowered. On the other hand, a can member made of resin is also used. However, a thickness size of the partition is set larger as compared with that of the can member made of metal so as to maintain a mechanical strength of the partition. For example, in the case of a pump for delivering a chemical solution, in general, a pressure fluctuation is scarcely generated as a result of a reduced pressure inside the motor stator. Moreover, a pressure fluctuation in a compressing direction with respect to the can member, which is generated on the atmosphere side around the motor, is also extremely small. On the contrary, a pressure in a direction in which the can member expands outward is generally applied. In this case, the applied pressure is supported by the stator core located on the outer circumference of the can member. Therefore, even the can member having a relatively small thickness does not expand to burst. On the other hand, in the case of the canned motor for the vacuum pump, a large pressure in the compressing direction directly acts on the can member by a difference in pressure between a pressure in a vacuum region in the rotor chamber and the atmospheric pressure around the motor, which is generated during the operation. In other words, the can member is subjected to a large tensile force acting toward the interior of the rotor chamber. Therefore, in the case of the canned motor for the vacuum pump, a strength of the can member is increased by increasing the thickness of the can member to prevent radially inward buckling distortion of the can member by a compressing force.

For the canned motor including the can made of resin, when the thickness of the can is set too small, the mechanical strength of the can is lowered. As a result, there is a fear in that the can cannot resist to the pressure fluctuation in the vacuum pump. Therefore, the reduction in the thickness of the can is limited. The thickness of the can made of resin is generally set based on a pressure vessel calculating method described in JIS B8267 and the like, and is about 1.5 to 2.0 mm.

SUMMARY OF INVENTION

According to one embodiment of the present invention, a canned motor to be coupled to a vacuum pump and used as a rotary driving source for the vacuum pump is provided. The canned motor includes: a stator core; a rotor provided on an inner side of the stator core; and a non-conductive can provided between the stator core and the rotor. The non-conductive can is configured to separate the stator core and the rotor from each other in a state in which the non-conductive can is held in contact with the stator core. The non-conductive can is made of resin, ceramic, or composite material thereof. The non-conductive can is bonded to the stator core with an adhesive.

According to one embodiment of the present invention, a canned motor to be coupled to a vacuum pump and used as a rotary driving source for the vacuum pump is provided. The canned motor includes: a stator core; a rotor provided on an inner side of the stator core; and a can made of resin provided between the stator core and the rotor. The can is configured to separate the stator core and the rotor from each other. The can includes a barrel portion having a hollow shape and extending in a direction of a rotation center axis line of the rotor. At least one of an outer-diameter side surface and an inner-diameter side surface of the barrel portion is approximately horizontal with an inclination of smaller than 0.5 degrees with respect to the rotation center axis line within at least a part of a range facing the stator core in the direction of the rotation center axis line.

According to one embodiment of the present invention, there is provided a canned motor to be used to rotationally drive a vacuum pump, the canned motor including a stator and a rotor separated from each other by a cylindrical resin partition covering an inter circumferential portion of the stator, in which an outer circumferential portion of the cylindrical resin partition forms a meshing portion to be brought into meshing engagement with magnetic-pole tooth portions of the stator in a radial direction.

According to one embodiment of the present invention, a canned motor to be coupled to a vacuum pump and used as a rotary driving source for the vacuum pump is provided. The canned motor includes: a stator core; a rotor provided on an inner side of the stator core; and a can provided between the stator core and the rotor. The can is configured to separate the stator core and the rotor from each other. The can includes: a barrel portion having a hollow shape and extending in a direction of a rotation center axis line of the rotor; and an opening portion for forming an opening of the barrel portion on a first side directly coupled to the vacuum pump in the direction of the rotation center axis line. The stator core and the rotor are separated from each other in a hermetically sealed manner by the can and an O-ring provided on an outer surface of the opening portion of the can along a circumferential direction.

BRIEF DESCRIPTION OF DRAWINGS

In the accompanying drawings:

FIG. 3A is an explanatory view illustrating a configuration of a can of a canned motor according to Embodiment 1-B;

FIG. 3B is an explanatory view illustrating the configuration of the can of the canned motor according to Embodiment 1-B;

DESCRIPTION OF EMBODIMENTS

1. First Embodiment Group

Figure 1:
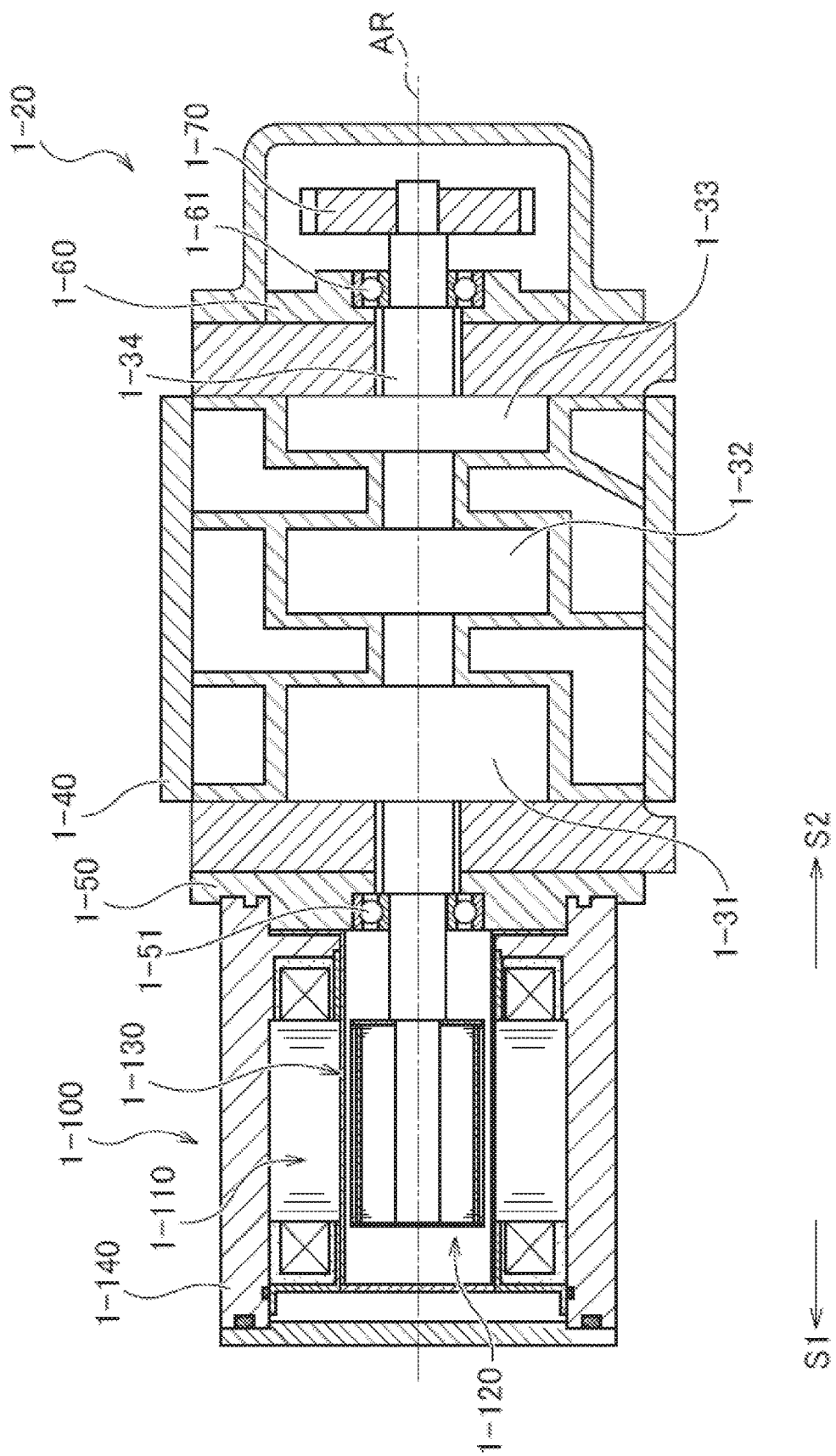
FIG. 1 is an explanatory view illustrating a schematic configuration of a vacuum pump according to Embodiment 1-A of the present invention.

According to one embodiment of the present invention, a canned motor to be coupled to a vacuum pump and used as a rotary driving source for the vacuum pump is provided. The canned motor includes: a stator core; a rotor provided on an inner side of the stator core; and a non-conductive can provided between the stator core and the rotor. The non-conductive can is configured to separate the stator core and the rotor from each other in a state in which the non-conductive can is held in contact with the stator core. The non-conductive can is made of resin, ceramic, or composite material thereof. The non-conductive can is bonded to the stator core with an adhesive.

With the canned motor described above, the non-conductive can and the stator core are held in contact with each other, and are further bonded with an adhesive. Therefore, in this state, the non-conductive can and the stator core are integrated with each other. Thus, a mechanical strength of a part of the non-conductive can, which is located at the position corresponding to the stator core, can be reinforced by the stator core. Therefore, a thickness of the part of the non-conductive can made of resin at the position corresponding to the stator core can be correspondingly reduced. As a result, motor characteristics can be improved.

According to one embodiment of the present invention, a canned motor to be coupled to a vacuum pump and used as a rotary driving source for the vacuum pump is provided. The canned motor includes: a stator core; a rotor provided on an inner side of the stator core; and a non-conductive can provided between the stator core and the rotor. The non-conductive can is configured to separate the stator core and the rotor from each other in a state in which the non-conductive can is held in contact with the stator core. The non-conductive can is made of resin, ceramic, or composite material thereof. The non-conductive can is bonded to the stator core with an adhesive through an underlayer formed on an outer surface of the non-conductive can. The underlayer is formed of a non-conductive material having a higher affinity for the adhesive than the non-conductive can.

With the canned motor described above, a bonding strength between the stator core and the non-conductive can is improved. Therefore, the mechanical strength of the non-conductive can can be further reinforced by the stator core. As a result, the thickness of the non-conductive can made of resin can be further reduced.

According to one embodiment of the present invention, the canned motor may further include an annular reinforcing member provided on an outer side of the stator core in a direction of a rotation center axis line of the rotor. The annular reinforcing member is held in contact with an outer surface of the non-conductive can in a circumferential direction. In the embodiment described above, the mechanical strength of the non-conductive can can be reinforced by the annular reinforcing member even in the region on the outer side of the stator core. Therefore, the thickness of the non-conductive can made of resin in the region on the outer side of the stator core can be correspondingly reduced.

According to one embodiment of the present invention, the non-conductive can may be bonded to the annular reinforcing member with an adhesive. In the embodiment described above, the non-conductive can and the annular reinforcing member are formed integrally, and hence the mechanical strength of the non-conductive can can be further reinforced in the region on the outer side of the stator core. Therefore, the thickness of the non-conductive can made of resin in the region on the outer side of the stator core can be correspondingly reduced.

According to one embodiment of the present invention, the non-conductive can may be bonded to the annular reinforcing member with an adhesive through an underlayer formed on the outer surface of the non-conductive can. The underlayer may be formed of non-conductive material having a higher affinity for the adhesive than the annular reinforcing member. In the embodiment described above, the bonding strength between the annular reinforcing member and the non-conductive can is improved. Therefore, the annular reinforcing member can further reinforce the mechanical strength of the non-conductive can. As a result, the thickness of the non-conductive can made of resin can be further reduced.

According to one embodiment of the present invention, a linear expansion coefficient of the annular reinforcing member may be equal to or smaller than a linear expansion coefficient of the stator core. In the embodiment described above, a stress acting on the non-conductive can from the annular reinforcing member can be reduced when compression heat is generated by driving the vacuum pump to thermally expand the annular reinforcing member. Therefore, the mechanical strength required for the non-conductive can can be reduced. As a result, the thickness of the non-conductive can can be reduced.

According to one embodiment of the present invention, a non-conductive member to be engaged with a plurality of teeth projecting toward a center of the stator core may be provided in spaces between inner-circumferential side end portions of the plurality of teeth in the stator core. In the embodiment described above, a bonding area with the adhesive becomes larger. Therefore, the bonding strength between the stator core and the non-conductive can can be enhanced. Therefore, the mechanical strength of the non-conductive can can be further reinforced by the stator core. As a result, the thickness of the non-conductive can made of resin can be further reduced.

According to one embodiment of the present invention, the canned motor may further include a stator frame formed so as to be longer than the stator core in a direction of a rotation center axis line of the rotor. The stator frame is configured to fix the stator core in a state in which the stator core is fitted into an internal space of the stator frame. The canned motor may further include a resin for filling an enclosed space formed in a region between the stator frame and the non-conductive can. The region corresponds to a coil portion projecting from both ends of the stator core in the direction of the rotation center axis line toward an outer side of the stator core. In the embodiment described above, the mechanical strength of the non-conductive can can be further reinforced by the resin filling the enclosed space. Therefore, the thickness of the non-conductive can made of resin in the region between the stator frame and the non-conductive can can be correspondingly reduced.

According to one embodiment of the present invention, a linear expansion coefficient of the resin filling the enclosed space may be equal to or smaller than a linear expansion coefficient of the stator core. In the embodiment described above, the stress acting on the non-conductive can from the resin filling the enclosed space through the annular reinforcing member can be reduced when the compression heat is generated by driving the vacuum pump to thermally expand the filling resin. Therefore, the mechanical strength required for the non-conductive can can be reduced. As a result, the thickness of the non-conductive can can be reduced.

According to one embodiment of the present invention, the non-conductive can may include: a barrel portion having a hollow shape and extending in a direction of a rotation center axis line of the rotor; closing portion for closing an internal space of the barrel portion on a first side in the direction of the rotation center axis line; and an opening portion for forming an opening of the barrel portion on a second side opposite to the first side. The closing portion may include a portion having an inner diameter decreasing from the second side toward the first side. In the embodiment described above, a volume of the non-conductive can is reduced. As a result, when the vacuum pump is driven, the amount of movement of a gas between the interior of the non-conductive can and the vacuum pump (pump chamber) is reduced. Specifically, the amount of gas passing through a bearing portion provided between the interior of the non-conductive can and the pump chamber is reduced. Therefore, a reduction of a lubricant, which is generated with the movement of the gas, can be suppressed. As a result, a burden of the maintenance and management of the vacuum pump can be reduced.

According to one embodiment of the present invention, the closing portion may have a dome shape of which a central portion expands from the second side toward the first side. In the embodiment described above, a mechanical strength of the closing portion can be improved. Moreover, as a result of the improvement of the mechanical strength, the thickness of the closing portion can be reduced. When the thickness of the closing portion is reduced, a difference in thickness between the barrel portion and the closing portion is reduced. Therefore, the manufacture of the non-conductive can made of resin by injection molding is facilitated.

According to one embodiment of the present invention, a rib may be formed on at least one of a surface of the closing portion on the first side and a surface of the closing portion on the second side. In the embodiment described above, the mechanical strength of the closing portion can be improved. Moreover, as a result of the improvement of the mechanical strength, the thickness of the closing portion can be reduced. Further, in the injection molding, a molded product is left in inner molds (male molds) when the molded product is demolded after molding. Therefore, when the rib is formed on the second-side surface of the closing portion, the molded product is easily locked to the inner molds. As a result, the manufacture of the non-conductive can made of resin by the injection molding is facilitated.

According to one embodiment of the present invention, a vacuum pump is provided. The vacuum pump may include the canned motor in any one of the embodiments described above.

According to one embodiment of the present invention, a canned motor to be coupled to a vacuum pump and used as a rotary driving source for the vacuum pump is provided. The canned motor includes: a stator core; a rotor provided on an inner side of the stator core; and a can provided between the stator core and the rotor. The can is configured to separate the stator core and the rotor from each other in a state in which the can is held in contact with the stator core. The can includes: a barrel portion having a hollow shape and extending in a direction of a rotation center axis line of the rotor; a closing portion for closing an internal space of the barrel portion on a first side in the direction of the rotation center axis line; and an opening portion for forming an opening of the barrel portion on a second side opposite to the first side. The closing portion includes a portion having an inner diameter decreasing from the second side toward the first side.

According to one embodiment of the present invention, the closing portion may have a dome shape of which a central portion expands from the second side toward the first side. According to one embodiment of the present invention, a rib may be formed on at least one of a surface of the closing portion on the first side and a surface of the closing portion on the second side. Any combination of the various embodiments described above is possible.

Further, according to one embodiment of the present invention, a canned motor to be coupled to a vacuum pump and used as a rotary driving source for the vacuum pump is provided. The canned motor includes: a stator core; a rotor provided on an inner side of the stator core; and a non-conductive can provided between the stator core and the rotor. The non-conductive can is configured to separate the stator core and the rotor from each other in a state in which the non-conductive can is held in contact with the stator core. The non-conductive can is made of resin, ceramic, or composite material thereof. The non-conductive can is bonded to the stator core with an adhesive. Further, according to one embodiment of the present invention, a canned motor to be coupled to a vacuum pump and used as a rotary driving source for the vacuum pump is provided. The canned motor includes: a stator core; a rotor provided on an inner side of the stator core; and a non-conductive can provided between the stator core and the rotor The non-conductive can is configured to separate the stator core and the rotor from each other in a state in which the non-conductive can is held in contact with the stator core. The non-conductive can is made of resin, ceramic, or composite material thereof. The non-conductive can is bonded to the stator core with an adhesive through an underlayer formed on an outer surface of the non-conductive can. The underlayer is formed of a non-conductive material having a higher affinity for the adhesive than the non-conductive can. Further, according to one embodiment of the present invention, a canned motor to be coupled to a vacuum pump and used as a rotary driving source for the vacuum pump is provided. The canned motor includes: a stator core; a rotor provided on an inner side of the stator core; and a can provided between the stator core and the rotor. The can is configured to separate the stator core and the rotor from each other in a state in which the can is held in contact with the stator core. The can includes: a barrel portion having a hollow shape and extending in a direction of a rotation center axis line of the rotor; a closing portion for closing an internal space of the barrel portion on a first side in the direction of the rotation center axis line; and an opening portion for forming an opening of the barrel portion on a second side opposite to the first side. The closing portion includes a portion having an inner diameter decreasing from the second side toward the first side. The application of the canned motor according to each of the embodiments described above is not limited to the pump, and the canned motor can also be applied to various pumps. For example, the canned motor according to each of the embodiments described above can be applied to liquid pumps and an air blower which is one kind of gas pumps in the broad sense of the term. Any combination of the canned motor according to each of these embodiments with the various embodiments described above applicable to the vacuum pump is possible. In the following, a first embodiment group of the present invention is described with the exemplification of more specific embodiments. In the following, the vacuum pump is described as an example. However, the embodiments described below are not limited to the vacuum pump as described above.

1-A. Embodiment 1-A

FIG. 1 illustrates a schematic cross section of a vacuum pump 1-20. FIG. 1 illustrates the cross section including a rotation center axis line AR of the vacuum pump 1-20. As illustrated in FIG. 1, the vacuum pump 1-20 includes a pair of rotors 1-30 (only one thereof is illustrated in FIG. 1). In this embodiment, each of the rotors includes a first-stage rotor 1-31, a second-stage rotor 1-32, a third-stage rotor 1-33, and a pump main shaft 1-34. In the vicinity of both end portions of each of the rotors 1-30, each of the rotors 1-30 is supported by a bearing 1-51 provided to a bearing member 1-50 and a bearing 1-61 provided to a bearing member 1-60. The rotor 1-30 is housed inside a casing 1-40. An intake port (not shown) is formed in an upper part of the casing 1-40, whereas an exhaust port (not shown) is formed in a lower part of the casing 1-40.

The rotor 1-30 is driven by a motor 1-100 provided on one end side of the rotation center axis line AR of the vacuum pump 1-20. A pair of timing gears 1-70 (only one timing gear is illustrated in FIG. 1) meshing with each other is fixed to a shaft end of the pair of rotors 1-30 on one end side. The other shaft end of each of the rotors 1-30 is coupled to the motor 1-100. In this embodiment, the motor 1-100 is a brushless DC motor. FIG. 1 illustrates a configuration of the motor 1-100 in a simplified manner.

When the motor 1-100 is driven, the rotors 1-30 rotate in the directions opposite to each other in a non-contact manner while keeping slight clearances between an inner surface of the casing 1-40 and the rotors 1-30 and between the rotors 1-30. With the rotation of the pair of rotors 1-30, a gas on the suction side is enclosed between the rotors 1-30 and the casing 1-40, and is then transferred to the discharge side. The gas introduced from the intake port (not shown) is transferred under compression by the rotors 1-30 having the three-stage rotors, and is exhausted from the exhaust port (not shown).

Figure 2:
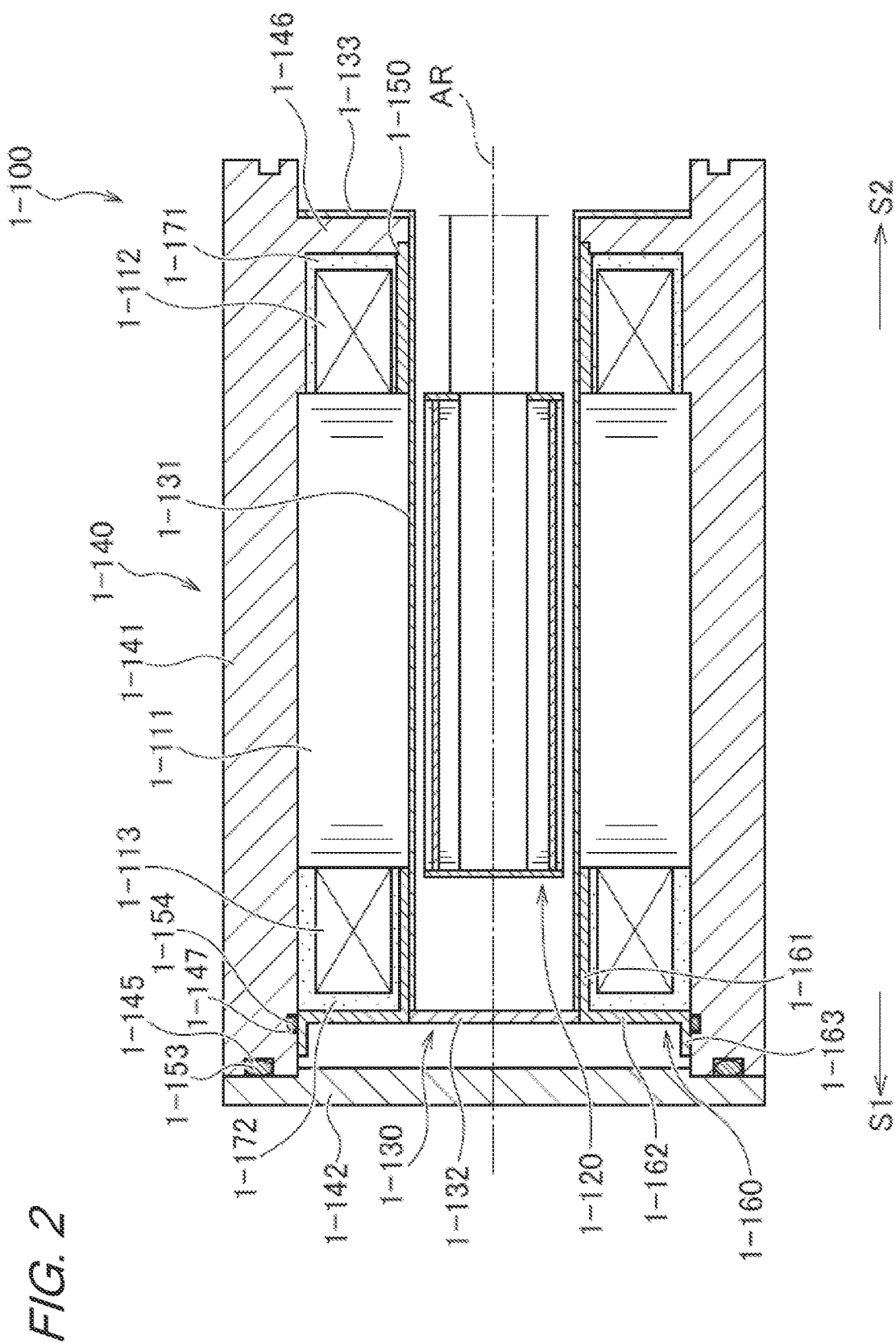
FIG. 2 is an explanatory view illustrating a schematic configuration of a canned motor according to Embodiment 1-A.

FIG. 2 illustrates a schematic configuration of the motor 1-100 which rotationally drives the rotors 1-30. In the following description, a side of the motor 1-100 to be coupled to the vacuum pump 1-20 (more specifically, the rotors 1-30) in the direction of the rotation center axis line AR is also referred to as a coupling side S2, whereas a side opposite to the coupling side S2 is also referred to as an outer side S1. As illustrated in FIG. 2, the motor 1-100 includes a stator 1-110, a rotor 1-120, a can 1-130, a stator frame 1-140, and reinforcing members 1-150 and 1-160.

The stator frame 1-140 includes a frame main body 1-141 and a side plate 1-142. The frame main body 1-141 has a cylindrical shape in which an internal space is formed along the rotation center axis line AR. The frame main body 1-141 includes a projecting portion 1-146. The projecting portion 1-146 is a portion which projects inward from an inner surface of the frame main body 1-141 and is formed in an annular shape around the rotation center axis line AR in the vicinity of an end portion of the frame main body 1-141 on the coupling side S2. A length of projection of the projecting portion 1-146 is formed so as to be approximately equal to a length of projection of an opening portion 1-133 from a barrel portion 1-131 (the details thereof are described below). The side plate 1-142 has a circular plate shape, and closes an opening of the frame main body 1-141 on the outer side S1. A concave portion 1-145 is formed on an end surface of the frame main body 1-141 on the outer side S1. An O-ring 1-153 is provided in the concave portion 1-145. The O-ring 1-153 is compressed in the direction of the rotation center axis line AR between the frame main body 1-141 and the side plate 1-142 so as to perform sealing between the interior of the stator frame 1-140 and the exterior thereof. The side plate 1-142 is mounted to the frame main body 1-141 with bolts (not shown). The stator frame 1-140 can be formed of, for example, iron or aluminum. The stator 1-110, the rotor 1-120, and the can 1-130 are housed in the internal space of the stator frame 1-140.

The stator 1-110 has a configuration in which coils are mounted to a stator core 1-111. At both ends of the stator 1-110 in the direction of the rotation center axis line AR, coil portions 1-112 and 1-113 project outward from the stator core 1-111. By fitting the stator core 1-111 into the interior of the frame main body 1-141 of the stator frame 1-140, the stator 1-110 is fixed to the stator frame 1-140 coaxially with the rotation center axis line AR. The stator core 1-111 can be formed by, for example, laminating silicon steel plates. The rotor 1-120 is provided coaxially with the rotation center axis line AR inside of the stator 1-110, and is directly coupled to the pump main shaft 1-34 of the rotor 1-30 of the vacuum pump 1-20.

The can 1-130 is provided between the stator 1-110 and the rotor 1-120 described above. The can 1-130 separates the stator 1-110 and the rotor 1-120 away from each other. The can 1-130 includes the barrel portion 1-131, a closing portion 1-132, and the opening portion 1-133. The barrel portion 1-131 has an approximately cylindrical shape, and is provided coaxially with the rotation center axis line AR. The barrel portion 1-131 is formed so as to extend over the range in which the stator 1-110 is provided in the direction of the rotation center axis line AR.

The closing portion 1-132 is an end surface of the can 1-130 on the outer side S1, and closes an internal space of the barrel portion 1-131 at an end portion of the barrel portion 1-131 on the outer side S1. The opening portion 1-133 is an end portion of the can 1-130 on the coupling side S2, and forms an opening of the can 1-130 on the coupling side S2. In this embodiment, the opening portion 1-133 has a flange-like shape having an outer diameter which is formed larger than that of the barrel portion 1-131.

The can 1-130 is formed of non-conductive resin. The barrel portion 1-131, the closing portion 1-132, and the opening portion 1-133 are formed integrally. A material of the can 1-130 is not limited to resin, and may also be ceramic or composite material of resin and ceramic. In this embodiment, the material of the can 1-130 is polyphenylene sulfide (PPS) resin. A thickness of each of the barrel portion 1-131 and the opening portion 1-133 can be set small, specifically, for example, in a range from 0.5 mm to 1.0 mm. A thickness of the closing portion 1-132 is set larger than that of the barrel portion 1-131, and can be set, for example, in a range from 1.5 mm to 2.0 mm. It is preferred that the thickness of the barrel portion 1-131 be as small as possible in view of the improvement of motor characteristics. Moreover, it is preferred that a width of the opening portion 1-133 (having the flange-like shape) in the direction of the rotation center axis line AR be as small as possible in view of reduction in a length of an overhang corresponding to a distance between the bearing 1-51 and the end portion of the motor 1-100 on the outer side S1.

The can 1-130 is mounted so that the stator core 1-111 and the barrel portion 1-131 are held in contact with each other in the circumferential direction. Further, the stator core 1-111 and the barrel portion 1-131 are bonded with an adhesive at a position at which the stator core 1-111 and the barrel portion 1-131 are held in contact. The stator core 1-111 and the barrel portion 1-131 are bonded to each other with the adhesive in this manner. As a result, in this state, the stator core 1-111 and the barrel portion 1-131 are integrated with each other. Therefore, a mechanical strength of a part of the barrel portion 1-131 at a position corresponding to the stator core 1-111 can be reinforced by the stator core 1-111. As a result, the thickness of the barrel portion 1-131 described above can be reduced at the position corresponding to the stator core 1-111. As the adhesive, a silicone adhesive or an epoxy adhesive can be used in view of heat resistance during the operation of the vacuum pump 1-20.

The can 1-130 is mounted in a state in which an end surface of the projecting portion 1-146 on the coupling side S2 and an end surface of the opening portion 1-133 on the outer side S1 are held in contact with each other. At this time, an inner end surface of the projecting portion 1-146 is held in contact with an outer surface of the barrel portion 1-131 in the circumferential direction. The projecting portion 1-146 has a function of positioning the can 1-130 in the direction of the rotation center axis line AR.

The reinforcing member 1-150 has an annular shape with an inner diameter approximately equal to an outer diameter of the barrel portion 1-131. The reinforcing member 1-150 is fitted on the outer side (on the coupling side S2) of the stator core 1-111 in the direction of the rotation center axis line AR so that the reinforcing member 1-150 and the barrel portion 1-131 are held in contact with each other in the circumferential direction. An end portion of the reinforcing member 1-150 on the outer side S1 is held in contact with the stator core 1-111, whereas an end portion thereof on the coupling side S2 is fitted into and held in contact with a cutout shape formed on the projecting portion 1-146 on the outer side S1. The reinforcing member 1-150 is preferred to be a member made of resin or non-magnetic metal, which has a tensile strength equal to or higher than 100 MPa.

Further, the reinforcing member 1-150 and the barrel portion 1-131 are bonded to each other with an adhesive at a position at which the reinforcing member 1-150 and the barrel portion 1-131 are held in contact with each other. The reinforcing member 1-150 and the barrel portion 1-131 are bonded to each other with the adhesive in this manner. As a result, in this state, the reinforcing member 1-150 and the barrel portion 1-131 are integrated with each other. Therefore, the mechanical strength of a part of the barrel portion 1-131 even on the coupling side S2 of the stator core 1-111 can be reinforced by the reinforcing member 1-150. As a result, a thickness of the part of the barrel portion 1-131 on the coupling side S2 of the stator core 1-111 can be reduced. A part of the barrel portion 1-131, which is located on the coupling side S2 of the reinforcing member 1-150, is held in contact with the projecting portion 1-146. As a result, the mechanical strength of the part of the barrel portion 131 is reinforced. It is apparent that the barrel portion 1-131 and the projecting portion 1-146 may be bonded with an adhesive.

The reinforcing member 1-160 includes a first part 1-161, a second part 1-162, and a third part 1-163. The first part 1-161 is a part of the reinforcing member 1-160, which is located at a position closest to the coupling side S2, and has an annular shape with an inner diameter approximately equal to an outer diameter of the barrel portion 1-131. The second part 1-162 has a flange-like shape extending coaxially from the first part 1-161 outward in the radial direction. The third part 1-163 has an annular shape extending from an outer-side end portion of the second part 1-162 toward the outer side S1.

The reinforcing member 1-160 is fitted on the outer side of the stator core 1-111 in the direction of the rotation center axis line AR so that the first part 1-161 and the barrel portion 1-131 are held in contact with each other in the circumferential direction. At this time, an end portion of the first part 1-161 on the outer side S1 is located on the outer side S1 of the coil portion 1-113, and is located at the same position as that of an end portion of the barrel portion 1-131 of the can 1-130 on the outer side S1 in the direction of the rotation center axis line AR. An end portion of the first part 1-161 on the coupling side S2 is held in contact with the stator core 1-111. Further, the first part 1-161 and the barrel portion 1-131 are bonded to each other with an adhesive at a position at which the first part 1-161 and the barrel portion 1-131 are held in contact with each other. Therefore, a mechanical strength of a part of the barrel portion 1-131 on the outer side S1 of the stator core 1-111 can be reinforced by the first part 1-161. As a result, a thickness of the part of the barrel portion 1-131, which is located on the outer side S1 of the stator core 1-111, can be reduced.

A length of the second part 1-162 in a direction perpendicular to the rotation center axis line AR is formed to be equal to a distance between the outer surface of the barrel portion 1-131 and the inner surface of the frame main body 1-141. Thus, the third part 1-163 is held in contact with the inner surface of the frame main body 1-141. By the configuration described above, the mechanical strength of the part of the barrel portion 1-131, which is located on the outer side S1 of the stator core 1-111, is further reinforced.

At a position on the frame main body 1-141, which corresponds to the third part 1-163, a concave portion 1-147 is formed. An O-ring 1-154 is provided in the concave portion 1-147. The O-ring 1-154 is compressed in a direction perpendicular to the rotation center axis line AR between the frame main body 1-141 and the third part 1-163 so as to perform sealing between the coupling side S2 and the outer side S1 of the reinforcing member 1-160.

Hermetically-sealed spaces are formed around the coil portions 1-112 and 1-113 in a region between the frame main body 1-141 and the barrel portion 1-131. The coil portions 1-112 and 1-113 are housed in the hermetically-sealed spaces, respectively. Specifically, the coil portion 1-112 on the coupling side S2 is housed in the space enclosed by the frame main body 1-141, the projecting portion 1-146, the reinforcing member 1-150, and the stator core 1-111, whereas the coil portion 1-113 on the outer side S1 is housed in the space enclosed by the frame main body 1-141, the first part 1-161, and the second part 1-162. The enclosed space on the coupling side S2 is filled with a resin 1-171, whereas the enclosed space on the outer side S1 is filled with a resin 1-172. With the configuration described above, the mechanical strength of the barrel portion 1-131 at both end portions of the stator core 1-111 can be further reinforced.

In the motor 1-100, it is preferred to set a linear expansion coefficient of each of the reinforcing members 1-150 and 1-160 equal to or smaller than a linear expansion coefficient of the stator core 1-111. Similarly, it is preferred to set a linear expansion coefficient of each of the resins 1-171 and 1-172 equal to or smaller than a linear expansion coefficient of the stator core 1-111. By setting the linear expansion coefficients as described above, a stress acting on the barrel portion 1-131 from the reinforcing members 1-150 and 1-160 and the resins 1-171 and 1-172 is reduced when compression heat is generated by driving the vacuum pump 1-20 to thermally expand the reinforcing members 1-150 and 1-160 and the resins 1-171 and 1-172. Therefore, the mechanical strength required for the barrel portion 1-131 can be reduced. As a result, the thickness of the barrel portion 1-131 can be reduced. For the same reason, it is preferred to set a linear expansion coefficient of the adhesive used to bond the stator core 1-111 and the barrel portion 1-131 and to bond the reinforcing members 1-150 and 1-160 and the barrel portion 1-131 equal to or smaller than the linear expansion coefficient of the stator core 1-111. Similarly, it is preferred to set the linear expansion coefficient of each of the reinforcing members 1-150 and 1-160 and the resins 1-171 and 1-172 equal to or smaller than a linear expansion coefficient of the frame main body 1-141. However, the linear expansion coefficient of the frame main body 1-141 is generally equal to or larger than that of the stator core 1-111. Therefore, the linear expansion coefficient of each of the reinforcing members 1-150 and 1-160 and the resins 1-171 and 1-172 generally becomes equal to or smaller than that of the frame main body 1-141 as long as the linear expansion coefficient of each of the reinforcing members 1-150 and 1-160 and the resins 1-171 and 1-172 is set equal to or smaller than that of the stator core 1-111.

According to the motor 1-100 described above, the mechanical strength of the barrel portion 1-131 of the can 1-130 is reinforced by various configurations described above. As a result, the thickness of the barrel portion 1-131 can be correspondingly reduced. Therefore, the characteristics of the motor 1-100 are improved. Moreover, by setting the thickness of the closing portion 1-132 of the can 1-130 larger than that of the barrel portion 1-131, the mechanical strength required for the closing portion 1-132 can be ensured.

The can 1-130 of the motor 1-100 can be suitably manufactured even by injection molding. In the injection molding, in order to allow the resin to smoothly flow into a cavity of a mold, it is preferred that a thickness of a molded product be uniform to some extent. Therefore, the can 1-130 may be manufactured in the following manner. Specifically, the barrel portion 1-131, the closing portion 1-132, and the opening portion 1-133 are first formed by injection molding to have the same thickness as that of the closing portion 1-132. Thereafter, the thickness of each of the barrel portion 1-131 and the opening portion 1-133 is reduced by cutting work and the like. Moreover, in the injection molding, a slight gradient is provided to the molded product so that the molded product is smoothly demolded after the molding. As described above, when the thickness of each of the barrel portion 1-131 and the opening portion 1-133 is reduced by cutting work and the like, the work can be conducted so as not to generate the gradient. In this manner, the barrel portion 1-131 and the stator core 1-111, and the barrel portion 1-131 and the reinforcing members 1-150, 1-160 can be easily bonded with the adhesive.

1-B. Embodiment 1-B

FIGS. 3A and 3B illustrate a configuration of a can 1-230 of a vacuum pump according to Embodiment 1-B. A vacuum pump according to Embodiment 1-B differs from that according to Embodiment 1-A only in a part of the configuration of the can, and the remaining points are the same as those of Embodiment 1-A. Therefore, for the can 1-230, only points different from Embodiment 1-A are described below. FIG. 3A is a partial sectional view of the can 1-230. FIG. 3B is a diagram of the can 1-230 as viewed from the coupling side S2.

Similarly to Embodiment 1-A, the can 1-230 includes a barrel portion 1-231, a closing portion 1-232, and an opening portion 1-233. The closing portion 1-232 is slightly rounded at an end portion connected to the barrel portion 1-231. On an inner surface of the closing portion 1-232, ribs 1-234 are formed in a spaced manner in a circumferential direction. Each of the ribs 1-234 is formed to extend from an end portion of the barrel portion 1-231 on the outer side S1 toward the vicinity of a central portion of the closing portion 1-232. The ribs 1-234 are formed so as to reach the vicinity of the central portion of the closing portion 1-232, while a thickness of the ribs 1-234 gradually decreases from the end portion of the barrel portion 1-231 on the outer side S1. Therefore, the ribs 1-234 do not interfere with a mounting member for the rotor 1-30 such as a bolt, which is provided in a space in the vicinity of the rotation center axis line AR in a part of the internal space located in the vicinity of the closing portion 1-232 of the can 1-230.

With the configuration described above, a strength of the closing portion 1-232 can be enhanced. Moreover, by the enhanced strength, a thickness of the closing portion 1-232 can be correspondingly reduced. Therefore, as described above, when the molded product having the thickness equal to that of the closing portion 1-232 as an overall thickness is manufactured by the injection molding, and is then subjected to the cutting work to manufacture the can 1-230, the thickness of the molded product obtained by the injection molding can be reduced. As a result, the amount of cutting work can be reduced.

Moreover, according to the configuration described above, the can 1-230 has an inner diameter which decreases from the coupling side S2 to the outer side S1 on the cross section of the part of the can 1-230, on which the ribs 1-234 are formed. Correspondingly, specifically, by the amount of volume of the ribs 1-234, an internal spatial volume of the can 1-230 is reduced. As a result, the amount of gas moving between the interior of the can 1-230 and the vacuum pump 1-20 when the vacuum pump 1-20 is driven is reduced. Specifically, the amount of gas passing through the bearing 1-51 provided between the internal space of the can 1-230 and the internal space of the casing 1-40 of the vacuum pump 1-20 is reduced. Therefore, the reduction in the amount of lubricant, which is generated with the movement of gas, can be suppressed. As a result, a burden of maintenance and management of the vacuum pump 1-20 can be reduced.

Further, in the injection molding, the molded product is left in inner molds when the molded product is demolded after the molding. The can 1-230 is provided with the ribs 1-234. Therefore, when the can 1-230 is manufactured by the injection molding, the molded product is more likely to be locked to the inner molds. As a result, the can 1-230 can be easily manufactured.

1-C. Embodiment 1-C

Figure 4:
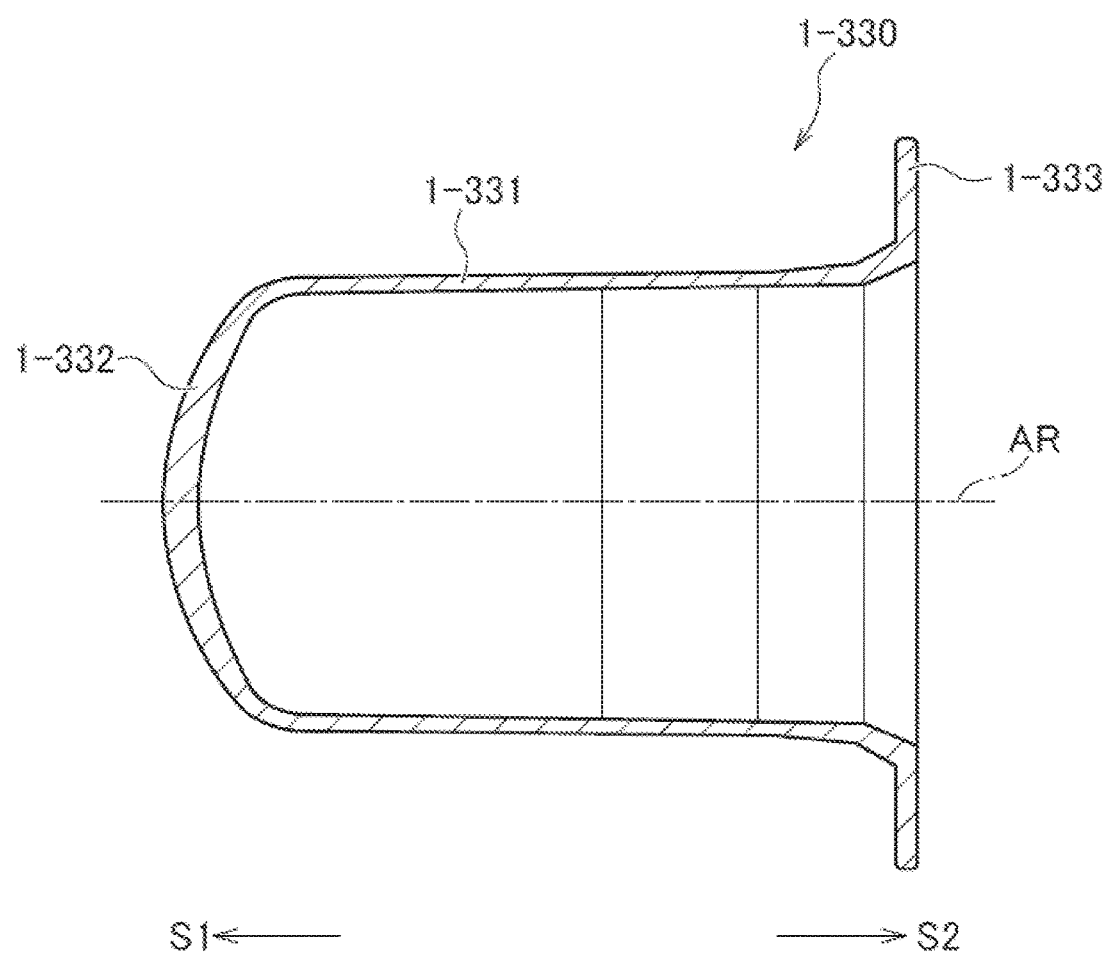
FIG. 4 is a partial sectional view illustrating a configuration of a can of a canned motor according to Embodiment 1-C.

FIG. 4 is a partial sectional view illustrating a configuration of a can 1-330 of a vacuum pump according to Embodiment 1-C. As illustrated in FIG. 4, a closing portion 1-332 of the can 1-330 has a dome shape of which a central portion expands from the coupling side S2 toward the outer side S1. A shape of an inner surface of the closing portion 1-332 conforms to that of an outer surface thereof. With the can 1-330, a mechanical strength of the closing portion 1-332 can be further improved. Moreover, an inner diameter of the closing portion 1-332 decreases from the coupling side S2 toward the outer side S1. Therefore, the same effects as those of Embodiment 1-B are obtained. It is apparent that ribs may be formed on the can 1-330 as in the case of Embodiment 1-B.

1-D. Embodiment 1-D

Figure 5:
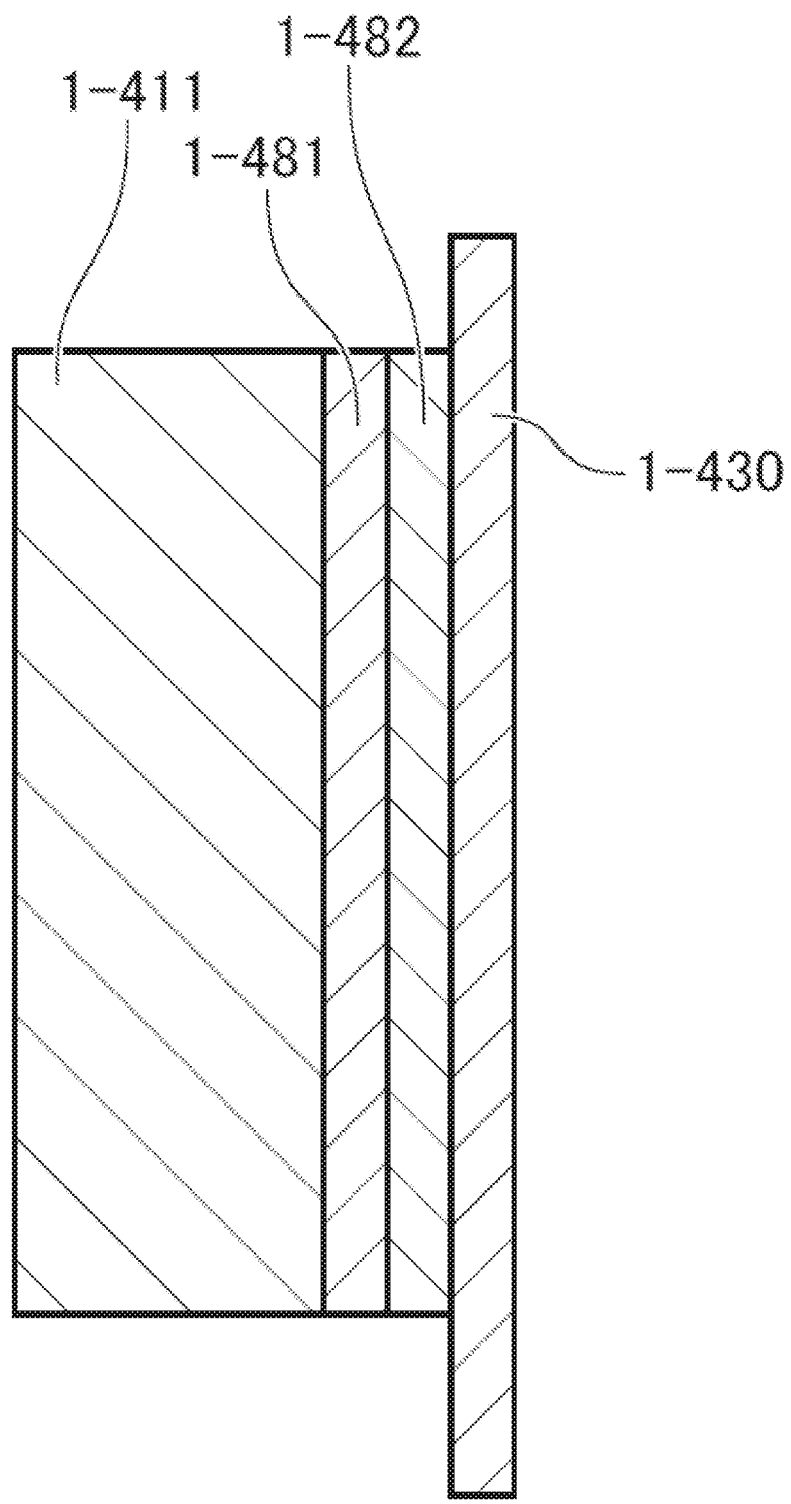
FIG. 5 is a sectional view illustrating a configuration in which a can and a stator core are bonded according to Embodiment 1-D.

FIG. 5 is a sectional view illustrating a configuration in which a can 1-430 and a stator core 1-411 of the vacuum pump according to Embodiment 1-D are bonded. As illustrated in FIG. 5, in this embodiment, the can 1-430 is bonded to the stator core 1-411 with an adhesive 1-481 through an underlayer 1-482 formed on an outer surface of the can 1-430. Specifically, on the outer surface of the can 1-430, the underlayer 1-482 is formed. The underlayer 1-482 is bonded to the stator core 1-411 with the adhesive 1-481. In this embodiment, the underlayer 1-482 is formed only on a region of the outer surface of the can 1-430, to which the stator core 1-411 is bonded. However, the underlayer 1-482 may be formed over the entire outer surface of the can 1-430.

The underlayer 1-482 can be formed of any of various non-conductive materials having a higher affinity for the adhesive 1-481 than the can 1-430. As the non-conductive materials, for example, polyimide resin and cross-linking component may be used. The underlayer 1-482 may be formed by applying a paste material or may be formed by plating or coating.

With the configuration described above, even when the can 1-130 is made of material having a relatively low affinity for the adhesive 1-481, for example, engineering plastic such as PPS, a bonding strength between the stator core 1-411 and the can 1-430 is improved. Therefore, the mechanical strength of the can 1-430 can be suitably reinforced by the stator core 1-411. As a result, a thickness of the can 1-430 can be reduced.

Further, the underlayer 1-482 may be formed of non-conductive material having a larger tensile strength than the can 1-430. As such material, ceramic such as $Al_2O_3$ may be used. In this case, the underlayer 1-482 may be formed by thermally spraying the ceramic onto the surface of the can 1-430. With the configuration described above, the strength of the can 1-430 having the reduced thickness can be reinforced.

In addition to or in place of the configuration of Embodiment 1-D described above, the can 1-430 may be bonded to the reinforcing members 1-150 and 1-160 (see Embodiment 1-A) with the adhesive 1-481 through the underlayer 1-482 although the illustration thereof is herein omitted. With the configuration described above, a bonding strength between the reinforcing members 1-150 and 1-160 and the can 1-430 is improved. Therefore, the mechanical strength of the can 1-430 can be further reinforced by the reinforcing members 1-150 and 1-160. Thus, the thickness of the can 1-430 can be further reduced.

1-E. Embodiment 1-E

Figure 6:
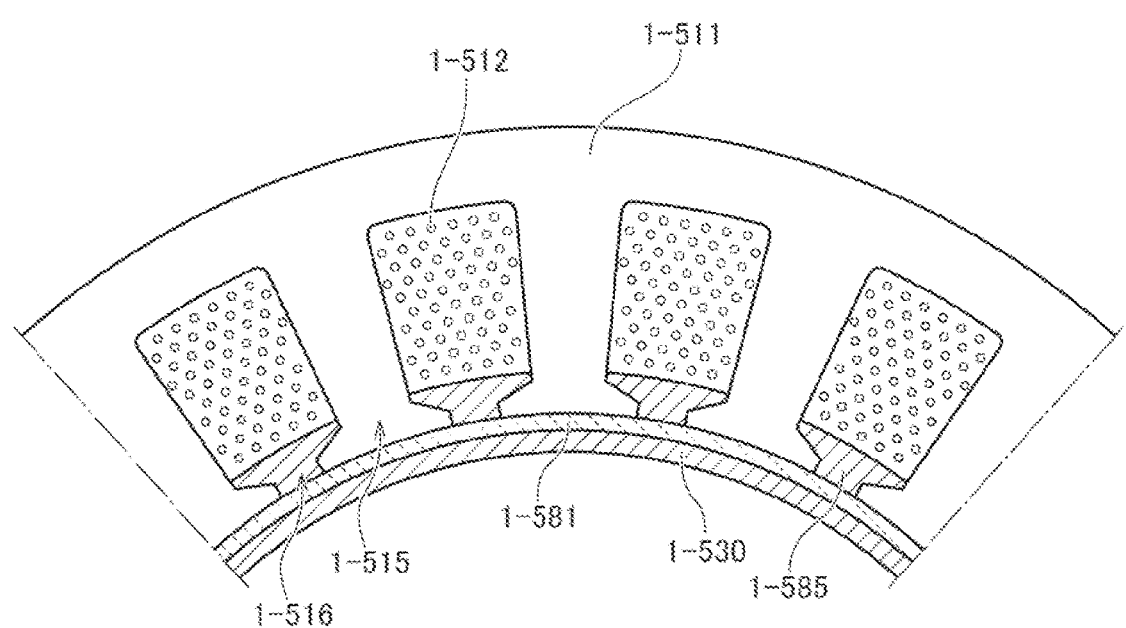
FIG. 6 is a sectional view illustrating a configuration in which a can and a stator core are bonded according to Embodiment 1-E.

FIG. 6 is a sectional view illustrating a configuration in which a can 1-530 and a stator core 1-511 of a vacuum pump according to Embodiment 1-E are bonded. FIG. 6 illustrates a cross section perpendicular to the rotation center axis line AR. As illustrated in FIG. 6, the stator core 1-511 includes a plurality of teeth 1-515 projecting toward the center of the stator core 1-511. A coil 1-512 is wound around each of the plurality of teeth 1-515 in concentrated winding. Spaces 1-516 are formed on the inner circumferential side between end portions of the plurality of teeth 1-515. In each of the spaces 1-516, a non-conductive member 1-585 to be engaged with the teeth 1-515 located on both sides of the non-conductive member 1-585 is provided.

The member 1-585 has a wedge-like shape. The members 1-585 are inserted into the stator core 1-511 so as to close the spaces 1-516. In this embodiment, the members 1-585 are made of glass epoxy resin. With the configuration described above, the can 1-530 and the teeth 1-515 of the stator core 1-511 are bonded with an adhesive 1-581. Further, in the spaces 1-516, the can 1-530 and the members 1-585 are bonded with the adhesive 1-581. The members 1-585 are engaged with the teeth 1-515. Therefore, the bonding between the can 1-530 and the members 1-585 contributes to the improvement of the bonding strength between the can 1-530 and the stator core 1-511. In this manner, a bonding area of the adhesive 1-581 is increased to enhance the bonding strength between the can 1-530 and the stator core 1-511. A mechanical strength of the can 1-530 can be further reinforced by the stator core 1-511. As a result, a thickness of the can 1-530 can be further reduced.

The members 1-585 may be formed by filling the spaces 1-516 with a resin. Moreover, the resin used for filling may be an adhesive. In this case, it is preferred that the adhesive have a heat resistance to a temperature at which the motor 1-100 is used. Further, it is preferred that a bonding strength of the adhesive be 1 kg/cm$^2$ (0.098 MPa) or higher. The above-mentioned points are similarly applied to the adhesive 1-581.

1-F: Variations

1-F-1. Variation 1-F-1

The shape of the closing portion of the can with the inner diameter decreasing from the coupling side S2 toward the outer side S1, described in Embodiments 1-B and 1-C, is not limited to the examples described above, and may be various. For example, the shape of the closing portion may be conical, truncated conical, or convex. In such a case, ribs may be formed on an outer surface of the closing portion. It is apparent that ribs are formed on both the inner surface and the outer surface of the closing portion.

1-F-2. Variation 1-F-2

The shape of the barrel portion 1-131 of the can 1-130 is not limited to the shape having an entirely reduced thickness. The thickness of the barrel portion 1-131 may be only partially reduced. For example, only a thickness of a portion of the barrel portion 1-131, which is held in contact with the stator core 1-111, may be reduced. The can having the shape described above may be manufactured by cutting work after the injection molding.

2. Second Embodiment Group

According to one embodiment of the present invention, a canned motor to be coupled to a vacuum pump and used as a rotary driving source for the vacuum pump is provided. The canned motor includes: a stator core; a rotor provided on an inner side of the stator core; and a can made of resin provided between the stator core and the rotor. The can is configured to separate the stator core and the rotor from each other. The can includes a barrel portion having a hollow shape and extending in a direction of a rotation center axis line of the rotor. At least one of an outer-diameter side surface and an inner-diameter side surface of the barrel portion is approximately horizontal with an inclination of smaller than 0.5 degrees with respect to the rotation center axis line within at least a part of a facing range which faces the stator core in the direction of the rotation center axis line.

When the can made of resin is manufactured by injection molding, a slight gradient is formed on a molded product so that the molded product is smoothly demolded after molding. With the canned motor in the above-mentioned embodiment, the gradient of the can is reduced. Therefore, the can and at least one of the stator core and the rotor can be provided in a more parallel manner. Therefore, a distance between the stator and the rotor can be reduced. As a result, the motor characteristics can be improved.

According to one embodiment of the present invention, a thickness of the facing range of the can may be smaller than a thickness of a remaining portion. According to the embodiment, the thickness of the facing range of the can is smaller than the thickness of the remaining portion. Therefore, the distance between the stator and the rotor can be further reduced. The mechanical strength of the can is reinforced by the stator core in the facing range, whereas the mechanical strength is suitably ensured by its own thickness in the remaining portion. Therefore, the mechanical strength of the entire can can also be ensured.

According to one embodiment of the present invention, a thickness of the can on the inner diameter side may be larger on a first side of the facing range in the direction of the rotation center axis line as compared with a thickness of the facing range, whereas a thickness of the can on the outer diameter side may be larger on a second side of the facing range, as compared with the thickness of the facing range. The second side is opposite to the first side. According to the embodiment, the amount of processing is reduced to effectively process the molded product when the can is manufactured as follows: the molded product including a portion corresponding to the barrel portion is initially manufactured by the injection molding; and then the thickness of a processed portion of the molded product is reduced by processing the molded product.

According to one embodiment of the present invention, a vacuum pump is provided. The vacuum pump may include the canned motor in any one of the embodiments described above.

According to one embodiment of the present invention, there is provided a method of manufacturing a can for a canned motor, the can including a hollow barrel portion extending in a specific direction. The method of manufacturing the can includes: injection molding to manufacture a molded product including a portion corresponding to the barrel portion; and processing at least one of an outer-diameter side surface and an inner-diameter side surface of the molded product to reduce an inclination of the at least one of the outer-diameter side surface and the inner-diameter side surface with respect to a specific direction and to manufacture the can. According to the embodiment, the can included in the canned motor according to the embodiment described above can be suitably manufactured.

According to one embodiment of the present invention, the processing may further include reducing the inclination of the at least one of the outer-diameter side surface and the inner-diameter side surface with respect to the specific direction. Further, in the processing, the inner-diameter side surface of the molded product may be processed to reduce the thickness of the processed portion on the first side of the molded product. Moreover, the outer-diameter side surface of the molded product may be processed to reduce the thickness of the processed portion on the second side of the molded product. In the embodiment described above, the can having a larger thickness on the inner diameter side, as compared with the thickness of the facing range, on the first side of the facing range in the direction of the rotation center axis line, and having a larger thickness on the outer diameter side, as compared with the thickness of the facing range, on the second side of the facing range which is opposite to the first side can be suitably manufactured.

According to one embodiment of the present invention, the injection molding described above is provided. Moreover, in place of the processing in the embodiment described above, there is provided processing at least one of the outer-diameter side surface and the inner-diameter side surface of the molded product to reduce the thickness of the processed portion of the molded product. In the embodiment described above, as compared with the case where the can is manufactured only by the injection molding, the degree of freedom for the shape of the can can be increased. Any combination of the various embodiments described above is possible.

Further, according to one embodiment of the present invention, a canned motor is provided. The canned motor includes: a stator core; a rotor provided on an inner side of the stator core; and a can made of resin provided between the stator core and the rotor. The can is configured to separate the stator core and the rotor from each other. The can includes a barrel portion having a hollow shape and extending in a direction of a rotation center axis line of the rotor. At least one of an outer-diameter side surface and an inner-diameter side surface of the barrel portion is approximately horizontal with an inclination of smaller than 0.5 degrees with respect to the rotation center axis line within at least a part of a range facing the stator core in the direction of the rotation center axis line. The canned motor according to the embodiment described above can be applied to various types of pumps. For example, the canned motor according to the embodiment described above is applicable to liquid pumps and an air blower which is a kind of gas pumps in the broad sense of the term. Any combination of the canned motor according to this embodiment with the various embodiments described above applicable to the vacuum pump is possible. In the following, a second embodiment group of the present invention is described with the exemplification of more specific embodiments. Although the vacuum pump is described below as an example, embodiments described below are not limited to the vacuum pump as described above.

2-A. Embodiment 2-A

Figure 7:
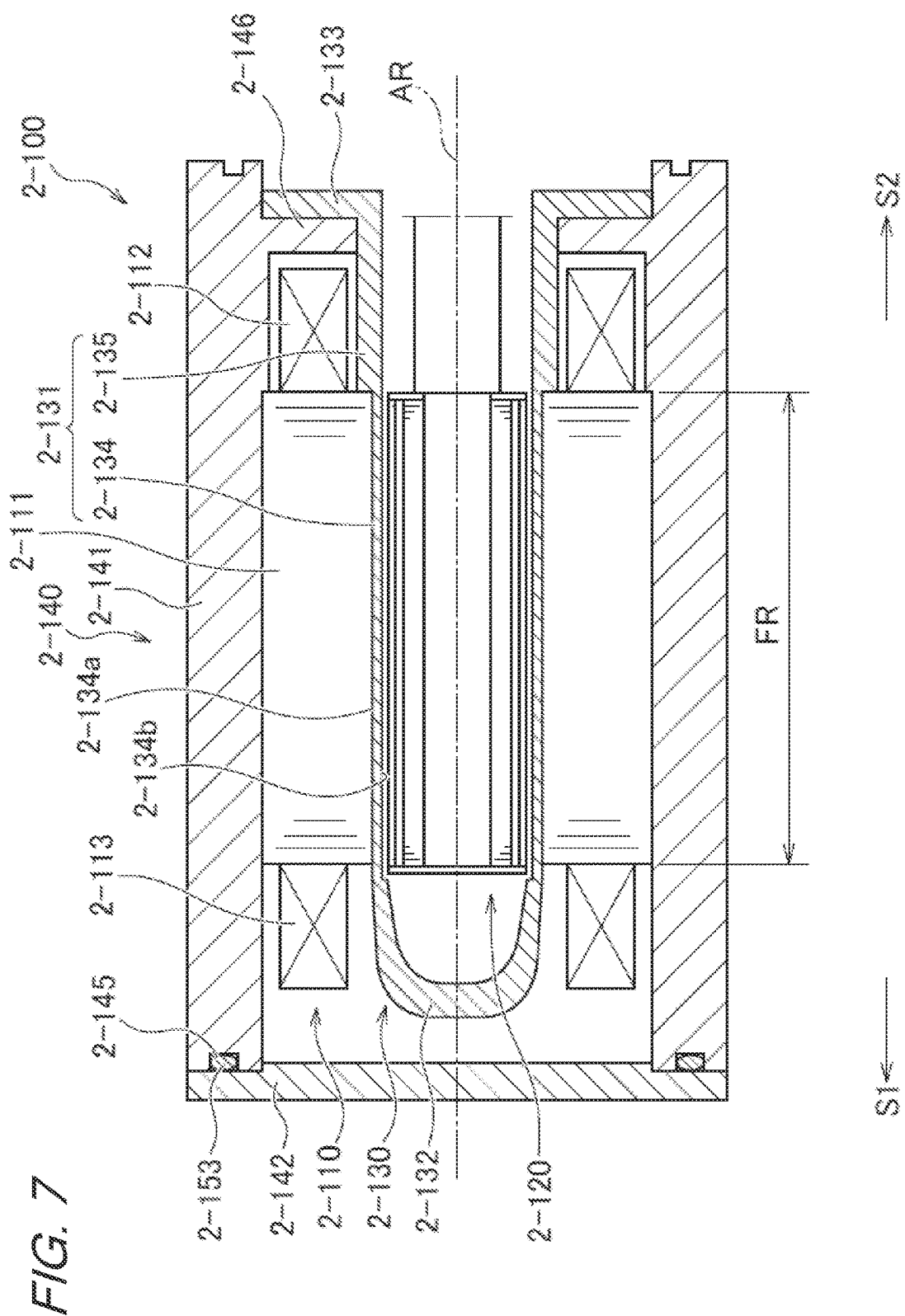
FIG. 7 is an explanatory view illustrating a schematic configuration of a canned motor according to Embodiment 2-A.

In Embodiment 2-A, an overall configuration of the vacuum pump 1-20 is the same as that of Embodiment 1-A. Therefore, points different from Embodiment 1-A are mainly described below. FIG. 7 illustrates a schematic configuration of a motor 2-100 which rotationally drives rotors 2-30. In the following description, a side of the motor 2-100 to be coupled to a vacuum pump 2-20 (more specifically, the rotors 2-30) in the direction of the rotation center axis line AR is also referred to as the coupling side S2, whereas a side opposite to the coupling side S2 is also referred to as the outer side S1. As illustrated in FIG. 7, the motor 2-100 includes a stator 2-110, a rotor 2-120, a can 2-130, and a stator frame 2-140.

The stator frame 2-140 includes a frame main body 2-141 and a side plate 2-142. The frame main body 2-141 has a cylindrical shape in which an internal space is formed along the rotation center axis line AR. The frame main body 2-141 includes a projecting portion 2-146. The projecting portion 2-146 is a portion which projects inward from an inner surface of the frame main body 2-141 and is formed in an annular shape around the rotation center axis line AR in the vicinity of an end portion of the frame main body 2-141 on the coupling side S2. A length of projection of the projecting portion 2-146 is formed so as to be approximately equal to a length of projection of an opening portion 2-133 from a barrel portion 2-131 (the details thereof are described below). The side plate 2-142 has a circular plate shape, and closes an opening of the frame main body 2-141 on the outer side S1. A concave portion 2-145 is formed on an end surface of the frame main body 2-141 on the outer side S1. An O-ring 2-153 is provided in the concave portion 2-145. The O-ring 2-153 is compressed in the direction of the rotation center axis line AR between the frame main body 2-141 and the side plate 2-142 so as to perform sealing between the interior of the stator frame 2-140 and the exterior thereof. The side plate 2-142 is mounted to the frame main body 2-141 with bolts (not shown). The stator frame 2-140 can be formed of, for example, iron or aluminum. The stator 2-110, the rotor 2-120, and the can 2-130 are housed in the internal space of the stator frame 2-140.

The stator 2-110 has a configuration in which coils are mounted to a stator core 2-111. At both ends of the stator 2-110 in the direction of the rotation center axis line AR, coil portions 2-112 and 2-113 project outward from the stator core 2-111. By fitting the stator core 2-111 into the interior of the frame main body 2-141 of the stator frame 2-140, the stator 2-110 is fixed to the stator frame 2-140 coaxially with the rotation center axis line AR. The stator core 2-111 can be formed by, for example, laminating silicon steel plates. The rotor 2-120 is provided coaxially with the rotation center axis line AR inside of the stator 2-110, and is directly coupled to a pump main shaft 2-34 of the rotor 2-30 of the vacuum pump 2-20.

The can 2-130 is provided between the stator 2-110 and the rotor 2-120 described above. The can 2-130 separates the stator 2-110 and the rotor 2-120 away from each other. The can 2-130 includes the barrel portion 2-131, a closing portion 2-132, and the opening portion 2-133.

The barrel portion 2-131 has an approximately cylindrical shape, and is provided coaxially with the rotation center axis line AR. The barrel portion 2-131 includes a first barrel portion 2-134 on the outer side S1 and a second barrel portion 2-135 on the coupling side S2. The first barrel portion 2-134 is formed to extend over the entire range in which the stator core 2-111 is provided in the direction of the rotation center axis line AR and to face an inner surface of the stator core 2-111. The range of the first barrel portion 2-131, which faces the stator core 2-111, is also referred to as a facing range FR.

The second barrel portion 2-135 is formed on the coupling side S2 of the facing range FR. A thickness of the second barrel portion 2-135 is larger than that of the first barrel portion 2-134. Specifically, the second barrel portion 2-135 has a thickness which becomes larger toward the outer diameter side as compared with the first barrel portion 2-134. More specifically, although an inner surface of the second barrel portion 2-135 is located at the same position as the first barrel portion 2-134 in the direction perpendicular to the rotation center axis line AR, an outer surface of the second barrel portion 2-135 is located on the outer side of an outer surface of the first barrel portion 2-134. As a result, an outer diameter of the second barrel portion 2-135 is larger than that of the first barrel portion 2-134. An end surface of the second barrel portion 2-135 on the outer side S1 is held in contact with an end surface of the stator core 2-111 on the coupling side S2.

The closing portion 2-132 is an end surface of the can 2-130 on the outer side S1, and closes an internal space of the barrel portion 2-131 at the end portion of the barrel portion 2-131 on the outer side S1. In this embodiment, the closing portion 2-132 has a shape with an outer diameter and an inner diameter decreasing from the coupling side S2 toward the outer side S1. A thickness of the closing portion 2-132 is larger than that of the first barrel portion 2-134. Specifically, the closing portion 2-132 has a thickness which becomes larger toward the inner diameter side as compared with the first barrel portion 2-134. More specifically, although an outer surface of the closing portion 2-132 is located at approximately the same position as the first barrel portion 2-134 in the direction perpendicular to the rotation center axis line AR in the vicinity of the first barrel portion 2-134, an inner surface of the closing portion 2-132 is located on the inner side of the inner surface of the first barrel portion 2-134.

The opening portion 2-133 is an end portion of the can 2-130 on the coupling side S2, and forms an opening of the can 2-130 on the coupling side S2. In this embodiment, the opening portion 1-233 has a flange-like shape having an outer diameter which is formed larger than that of the barrel portion 2-131. An end surface of the opening portion 2-133 on the outer side S1 is held in contact with an end surface of the projecting portion 2-146 on the coupling side S2. The can 2-130 is positioned in the direction of the rotation center axis line AR based on the relationship of contact between the end surface of the opening portion 2-133 and the end surface of the projecting portion 2-146 and the above-mentioned relationship of contact between the second barrel portion 2-135 and the stator core 2-111.

The can 2-130 is formed of resin. The barrel portion 2-131, the closing portion 2-132, and the opening portion 2-133 are formed integrally. In this embodiment, the material of the can 2-130 is polyphenylene sulfide (PPS) resin.

In the can 2130, a thickness of each of the closing portion 2-132 and the second barrel portion 2-135 is set to have a mechanical strength resistible to a pressure fluctuation generated during the operation of the vacuum pump 2-20. The thicknesses of the closing portion 2-132 and the second barrel portion 2-135 are generally set based on a pressure vessel calculating method described in JIS B8267 and the like, and are about 1.5 to 2.0 mm. In this embodiment, a thickness of the opening portion 2-133 (thickness in the direction of the rotation center axis line AR) is approximately the same as that of the second barrel portion 2-135. In this manner, the resin can smoothly flow inside a cavity when the can 2-130 is manufactured by using the injection molding. Therefore, the manufacture is easy.

On the other hand, the first barrel portion 2-134 is formed to have a smaller thickness than that of each of the closing portion 2-132 and the second barrel portion 2-135. The thickness of the first barrel portion 2-134 can be set, for example, in a range from 0.5 mm to 1.0 mm. By reducing the thickness of the first barrel portion 2-134 in this manner, a distance between the stator core 2-111 and the rotor 2-120 is reduced. Therefore, motor characteristics of the motor 2-100 are improved.

An outer surface 2-134a and an inner surface 2-134b of the first barrel portion 2-134 are formed over the entire facing range FR so as to be approximately horizontal with an inclination of 0.5 degrees or smaller to the rotation center axis line AR. The can made of resin is generally manufactured by the injection molding. Moreover, in the injection molding, a mold is provided with a slight gradient so as to enable smooth demolding after molding. The gradient is referred to as a draft angle, and is generally 1 to 2 degrees. As a result, the molded product is formed with the gradient. As is apparent from the description given above, the inclination generated due to the draft angle is reduced for the outer surface 2-134a and the inner surface 2-134b of the first barrel portion 2-134. The shape of the barrel portion 2-131 described above is actualized by a method of manufacturing the can 2-130 described later.

It is preferred that the inclination be as small as possible. For example, the inclination is preferably set to be 0.3 degrees or smaller, more preferably 0.2 degrees or smaller, most preferably 0 degree. In this embodiment, the inclination of each of the outer surface 2-134a and the inner surface 2-134b is 0 degree. Specifically, the outer surface 2-134a and the inner surface 2-134b, and the rotation center axis line AR are precisely parallel to each other. In this embodiment, even the inclination of each of the outer surface and the inner surface of the second barrel portion 2-135 with respect to the rotation center axis line AR is 0 degree.

The can 2-130 is mounted so that the stator core 2-111 and the first barrel portion 2-134 are held in contact with each other in the circumferential direction. The outer surface 2-134a of the first barrel portion 2-134 does not have any inclination with respect to the rotation center axis line AR. Therefore, the stator core 2-111 and the first barrel portion 2-134 can be reliably brought into close contact with each other over the entire facing range FR. In other words, a local clearance formed between the stator core 2-111 and the outer surface 2-134a due to the inclination is reduced corresponding to the reduction of the inclination of the outer surface 2-134a with respect to the rotation center axis line AR. Therefore, as compared with the case where the outer surface 2-134a has the inclination with respect to the rotation center axis line AR, a distance between the stator core 2-111 and the rotor 2-120 can be reduced. Moreover, although the thickness of the first barrel portion 2-134 is reduced as compared with those of the closing portion 2-132 and the second barrel portion 2-135 as described above, by the reliable close contact between the stator core 2-111 and the first barrel portion 2-134 over the entire facing range FR, the mechanical strength of the first barrel portion 2-134 is reinforced by the stator core 2-111.

Moreover, the inner surface 2-134b of the first barrel portion 2-134 does not have any inclination with respect to the rotation center axis line AR. Therefore, the distance between the inner surface 2-134b and the rotor 2-120 becomes constant at any position in the direction of the rotation center axis line AR. A specific distance is required to be ensured between the inner surface 2-134b and the rotor 2-120 in order to avoid the interference therebetween. Therefore, when the inner surface 2-134b has the inclination with respect to the rotation center axis line AR, a portion with a distance which is necessary minimum to avoid the interference is locally generated. On the other hand, with the first barrel portion 2-134, the distance between the stator core 2-111 and the rotor 2-120 can be reduced by the amount of reduction in the inclination as compared with the case where the first barrel portion 2-134 has the inclination with respect to the rotation center axis line AR.

Further, in this embodiment, the stator core 2-111 and the first barrel portion 2-134 are bonded with an adhesive in a portion in which the stator core 2-111 and the first barrel portion 2-134 are held in contact with each other. By bonding the stator core 2-111 and the first barrel portion 2-134 with the adhesive in this manner, the stator core 2-111 and the first barrel portion 2-134 are integrated with each other in this state. Therefore, the mechanical strength of the first barrel portion 2-134 can be further reinforced by the stator core 2-111. As the adhesive, a heat resistant adhesive such as a silicone adhesive or an epoxy adhesive can be used in view of heat resistance during the operation of the vacuum pump 2-20.

The can 2-130 described above can be manufactured in the following manner. First, a molded product PM having portions corresponding to the barrel portion 2-131, the closing portion 2-132, and the opening portion 2-133 is manufactured by the injection molding. Next, an outer-diameter side surface and an inner-diameter side surface of the molded product PM are processed to reduce a thickness of the processed portions of the molded product PM to manufacture the can 2-130. With the manufacturing procedure described above, the degree of freedom for the shape of the can can be increased regardless of restrictions in shape resulting from the injection molding. The processing of the molded product PM is described below in detail.

Figure 8:
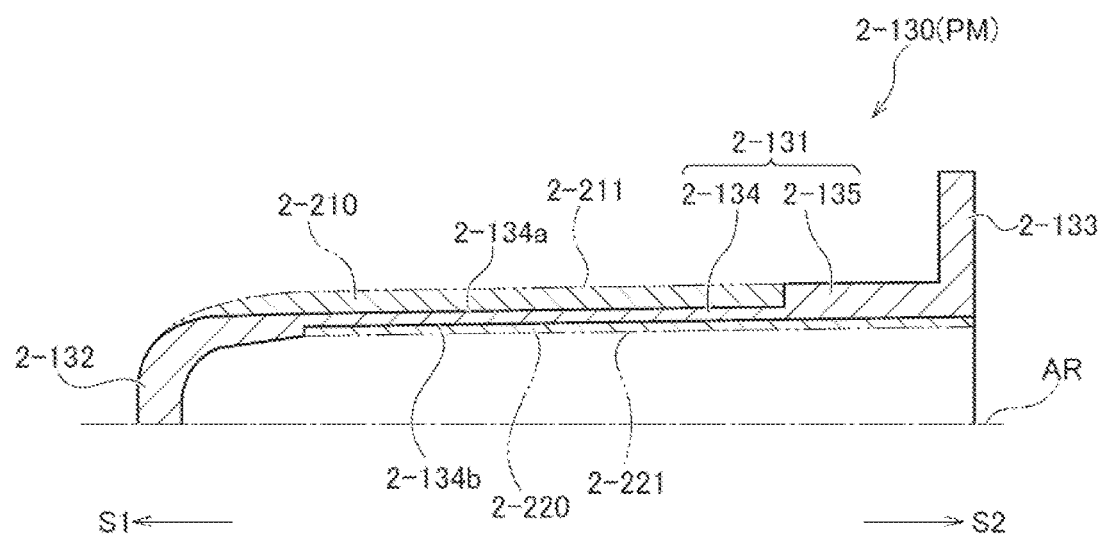
FIG. 8 is an explanatory view illustrating a method of manufacturing the can.

FIG. 8 illustrates a method of manufacturing the can, more specifically, a method of processing the molded product PM. FIG. 8 illustrates a cross section of only a half of the molded product PM. In a portion of the molded product PM corresponding to the first barrel portion 2-134, an upper surface 2-211 and a lower surface 2-221 are formed. The upper surface 2-211 and the lower surface 2-221 have the inclination of about 1 to 2 degrees with respect to the rotation center axis line AR, resulting from the draft angle.

In this embodiment, both the upper surface 2-111 and the lower surface 2-221 of the molded product PM are processed. An upper-surface side portion 2-210 of the molded product PM on the upper surface 2-211 side is subjected to cutting work to form the outer surface 2-134a parallel to the rotation center axis line AR. In this embodiment, a cut portion is a portion on the outer side S1, that is, a portion corresponding to the first barrel portion 2-134 and the closing portion 2-132. The cut portion only needs to include a portion corresponding to the first barrel portion 2-134, and cutting of the other portion can be omitted.

Similarly, a lower-surface side portion 2-220 of the molded product PM on the lower surface 2-211 side is subjected to cutting work to form the inner surface 2-134b parallel to the rotation center axis line AR. In this embodiment, a cut portion is a portion on the coupling side S2, that is, a portion corresponding to the first barrel portion 2-134, the second barrel portion 2-135, and the opening portion 2-133. The cut portion only needs to include a portion corresponding to the first barrel portion 2-134, and cutting of the other portion can be omitted.

In this embodiment, the cutting work described above is performed by lathe machining. However, a technique of processing the molded product PM is not particularly limited, and any technique may be used as long as the thickness of the desired portion of the molded product PM is reduced to form the desired shape. The processing technique may be, for example, grinding work, polishing work, etching, or a combination thereof.

With the manufacturing method described above, the can 2-130 described above can be suitably manufactured. For the upper surface 2-211 side of the molded product PM, only the outer side S1 is processed. For the lower surface 2-221 side, only the coupling side S2 is processed. Therefore, as compared with the case where the molded product PM entirely having a thickness larger than a required thickness is first manufactured and is then processed, the processing is effective without being needlessly long.

2-B: Variations

2-B-1. Variation 2-B-1

Only one of the outer surface 2-134a and the inner surface 2-134b of the first barrel portion 2-134 of the can 2-130 may have an inclination equal to or smaller than 0.7 degrees with respect to the rotation center axis line AR. In this case, only one of the upper surface 2-211 side and the lower surface 2-221 side of the molded product PM may be processed. Even in this manner, the effects described above are obtained to some extent as compared with the conventional configurations.

2-B-2. Variation 2-B-2

Only a part of the facing range FR of the first barrel portion 2-134 may have an inclination of 0.5 degrees or smaller with respect to the rotation center axis line AR. Even in this manner, the effects described above are obtained to some extent as compared with the conventional configurations.

2-B-3. Variation 2-B-3

The thickness of the facing range FR is not necessarily required to be reduced, and may be approximately equal to that of the closing portion 2-132 or the second barrel portion 2-135. In this case, the molded product PM may be subjected to minimum processing necessary for reducing the inclination of the outer surface 2-134a and the inner surface 2-134b of the first barrel portion 2-134 with respect to the rotation center axis line AR.

2-B-4. Variation 2-B-4

The can 2-130 is not necessarily required to have the shape closed on the outer side S1. For example, the first barrel portion 2-134 may be formed to extend to the outer side S1 to be brought into contact with the side plate 2-142 in a hermetically sealed manner. In this case, the thickness of the first barrel portion 2-134 on the outer side S1 of the facing range FR may be larger than that of the facing range FR.

3. Third Embodiment Group

According to one embodiment of the present invention, there is provided a canned motor to be used to rotationally drive a vacuum pump, the canned motor including a stator and a rotor separated from each other by a cylindrical resin partition covering an inter circumferential portion of the stator. An outer circumferential portion of the cylindrical resin partition forms a meshing portion to be brought into meshing engagement with magnetic-pole tooth portions of the stator in a radial direction. With the configuration described above, the outer circumferential portion of the partition forms the meshing portion which is brought into meshing engagement with the magnetic-pole tooth portions of the stator in the radial direction. With the configuration, a compressing force acting inward in the radial direction on the partition during the operation of the vacuum pump can be partially supported by the stator. Therefore, a thickness of the partition can be remarkably reduced as compared with the conventional configurations. As a result, a gap between the stator and the rotor is remarkably reduced to improve motor efficiency.

According to one embodiment, the meshing portion has a complementary sectional shape to the magnetic-pole tooth portions so as to be held in close contact with the magnetic-pole tooth portions. The meshing portion may form ribs extending in a length direction of the partition. In the embodiment described above, the meshing portion has a complementary sectional shape to the magnetic-pole tooth portions so as to be held in close contact with the magnetic-pole tooth portions, and the meshing portion forms the ribs extending in the length direction of the partition. With the embodiment, the cylindrical partition can be easily inserted into the stator so that the meshing portion is fitted to the magnetic-pole tooth portions. Therefore, the partition can be brought into close contact with the stator. As a result, the gap between the stator and the rotor can be remarkably reduced to improve the motor efficiency.

According to one embodiment of the present invention, the stator includes slots formed between the magnetic-pole tooth portions. The meshing portion may extend outward in the radial direction so as to retain windings in the slots. In the embodiment described above, the meshing portion extends outward in the radial direction so as to retain the windings in the slots. Therefore, the use of winding retaining members (in other words, spacers), which are conventionally inserted into the slots as independent members, can be omitted. Therefore, the number of components of the motor and the number of assembly steps can be significantly reduced, and hence the manufacturing cost of the motor can be significantly reduced.

According to one embodiment of the present invention, the meshing portion may include a concave portion which is open outward in the radial direction in the slot. According to this embodiment, the meshing portion includes the concave portion which is open outward in the radial direction. Therefore, the radial meshing engagement with the magnetic-pole tooth portions with the meshing portion is maintained. At the same time, as compared with the conventional winding retaining members (in other words, the spacers), each having a flat strip-like shape, the space inside the slot can be used to the maximum extent. Therefore, for example, the number of windings which can be housed in the slot is increased to remarkably improve the motor efficiency.

According to one embodiment of the present invention, a vacuum pump including the canned motor according to any one of the embodiments described above is provided.

According to one embodiment of the present invention, there is provided the following canned motor. The rotor chamber is used under a reduced-pressure atmosphere. Even when a large compressing force is subjected to the can member during the operation, the can member has no fear of deformation by the compressing force without increasing a thickness of the can member.

According to one embodiment of the present invention, a magnetic gap between the stator and the rotor is minimized. As a result, a canned motor which is capable of remarkably improving the motor efficiency can be provided.

According to one embodiment of the present invention, there can be provided a canned motor which is capable of remarkably reducing the number of components and the number of assembly steps.

According to one embodiment of the present invention, there can be provided a canned motor which allows the maximal use of the spaces inside the slots of the stator to remarkably improve the motor efficiency.

According to one embodiment of the present invention, there can be provided a vacuum pump including the canned motor described above. Any combination of the various embodiments described above is possible. In the following, a third embodiment group of the present invention is described with the exemplification of more specific embodiments.

3-A. Embodiment 3-A

Figure 9:
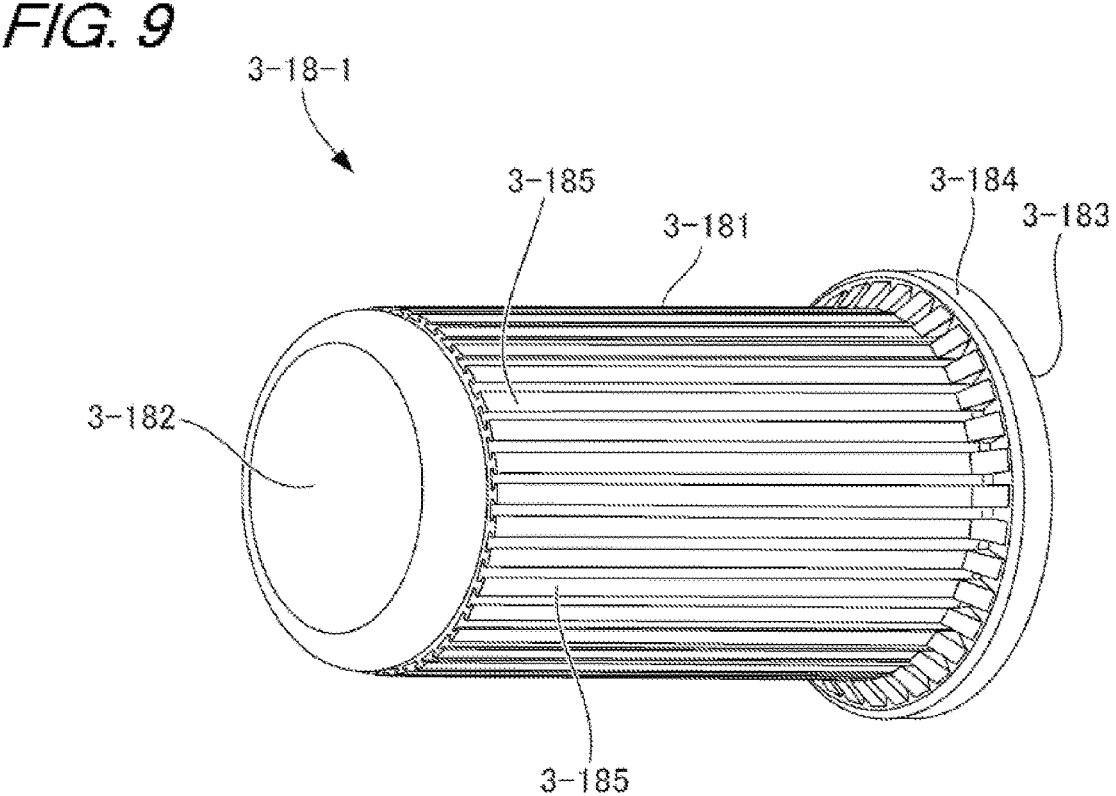
FIG. 9 is a perspective view illustrating the details of a partition according to Embodiment 3-A.

FIG. 9 is a perspective view illustrating the details of a configuration of a partition 3-18-1. The partition 3-18-1 is a component corresponding to the can 1-130 according to Embodiment 1-A. As a partition 3-18-2 (see FIG. 11) has the same configuration as that of the partition 3-18-1, FIG. 9 illustrates only the partition 3-18-1. As illustrated in FIG. 9, the partition 3-18-1 has a substantially cylindrical barrel portion 3-181. One end portion 3-182 of the barrel portion 3-181 in a length direction is closed, whereas the other end portion 3-183 is open. An annular flange portion 3-184 is formed on a circumferential edge of the open end portion 3-183. The annular flange portion 3-184 is fixed to a pump casing (corresponding to the casing 1-40 illustrated in FIG. 1) through bolts (not shown) in a hermetically sealed state. An outer circumferential surface of the barrel portion 3-181 includes ribs extending in the length direction of the partition 3-18-1. The ribs are formed by a meshing portion described below.

Figure 10:
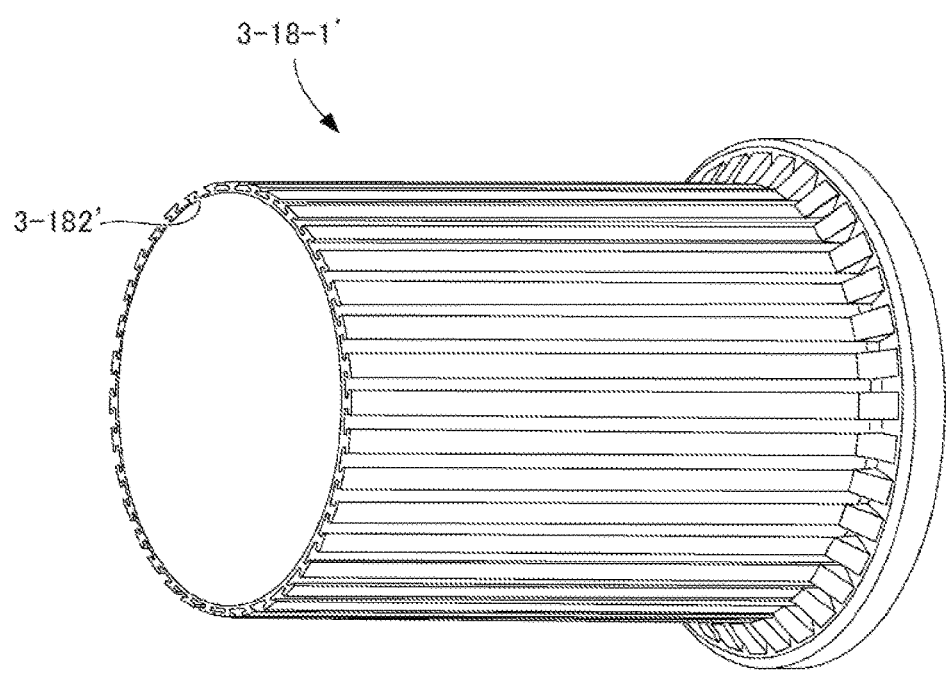
FIG. 10 is a perspective view illustrating another example of the configuration of the partition.

In the example illustrated in FIG. 9, the partition 3-18-1 is molded integrally into a cylindrical shape with a closed end. Specifically, the end portion 3-182 of the partition 3-18-1 on the side opposite to the annular flange portion 3-184 in the length direction is closed. However, the partition 3-18-1 may have an open end portion on the side opposite to the annular flange portion 3-184. FIG. 10 illustrates an example of a partition 3-18-1' including an opening end 3-182' as described above. In this case, an independent closing member is fixed to the opening end 3-182' in a hermetically sealed state.

Figure 11:
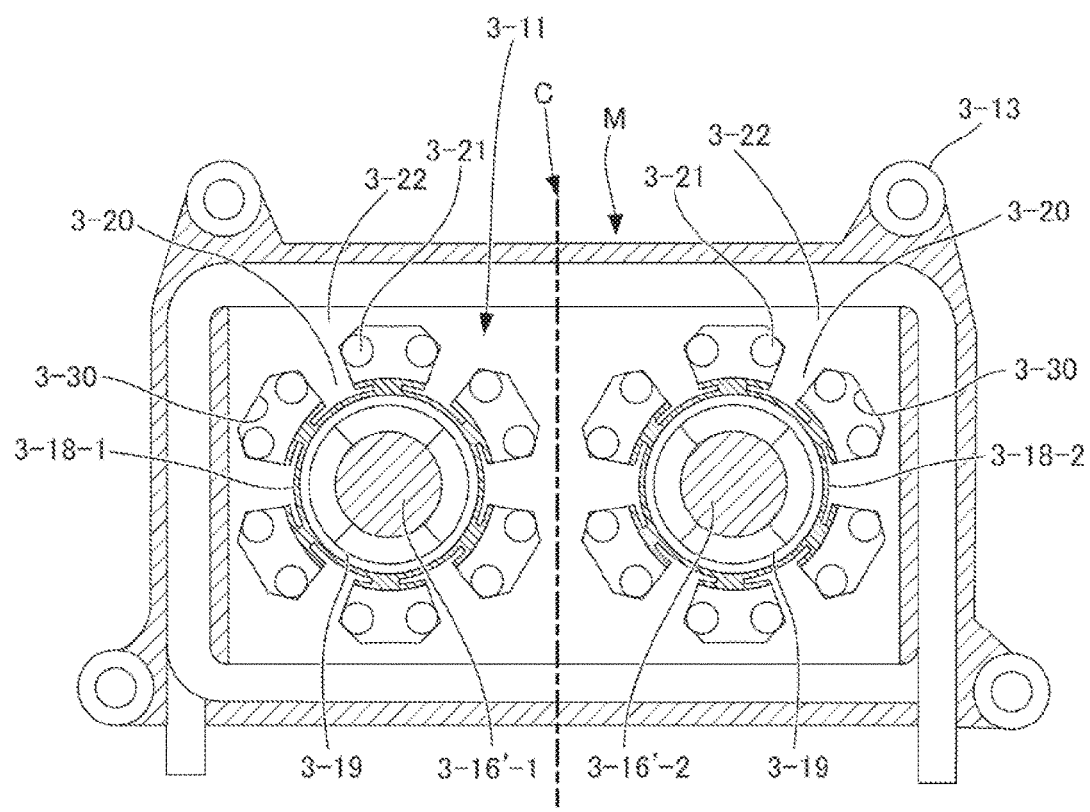
FIG. 11 is a sectional view of the motor taken along a radial direction.

FIG. 11 is a sectional view of a motor portion M (corresponding to the motor 1-100 illustrated in FIG. 1) in the radial direction. FIG. 11 illustrates a cross section perpendicular to a shaft of the motor M, and also illustrates a cooling pipe and a mounting portion for the motor, which are not illustrated in the other embodiments. Permanent magnets 3-19 are circumferentially provided to shafts 3-16'-1 and 3-16'-2 of motor rotors, which are directly coupled to a main shaft of a pump P. A stator 3-11 is provided on outer circumferences of the permanent magnets 3-19 through the partitions 3-18-1 and 3-18-2. In this manner, the motor M is configured. The stator 3-11 includes a stator core 3-22, a plurality of magnetic-pole tooth portions 3-20 extending inward in the radial direction of the stator core 3-22, and windings 3-21 provided in slots 3-30 formed between the magnetic-pole tooth portions 3-20 so as to be wound around the magnetic-pole tooth portions 3-20. A distal end portion of each of the magnetic-pole tooth portions 3-20 extends substantially in parallel to the permanent magnets 3-19 (in other words, in the circumferential direction) to form an extended portion (in other words, an expanded portion) 3-20-2 so as to increase a surface area opposed to the permanent magnets 3-19. The extended portion 3-20-2 has a larger sectional area than that of a magnetic-pole base portion 3-20-1 approximately linearly extending from the stator core 3-22 (see FIG. 12).

The magnetic-pole tooth portions 3-20 constitute a brushless DC motor. In the brushless DC motor, motor rotors 3-16-1 and 3-16-2 rotate in the opposite directions in synchronization at positions symmetrical about a central axis C between the motor rotors 3-16-1 and 3-16-2 so as to form the opposite magnetic poles when the windings 3-21 are energized. Although a double-shaft brushless DC motor is used as the motor M in this embodiment, a single-shaft brushless DC motor may be used in other embodiments. Moreover, the motor to which this embodiment is applied is not particularly limited as long as the motor is an electric motor.

This embodiment is suitably applied to the vacuum pump. In this specification, the term "vacuum pump" means a pump used in a state in which the pressure in the pump casing is reduced from the pressure around the pump during the operation. Specifically, the term "vacuum" encompasses a relative vacuum, and does not only mean an absolute vacuum. Moreover, this embodiment may be applied to pumps other than the vacuum pump.

Figure 12:
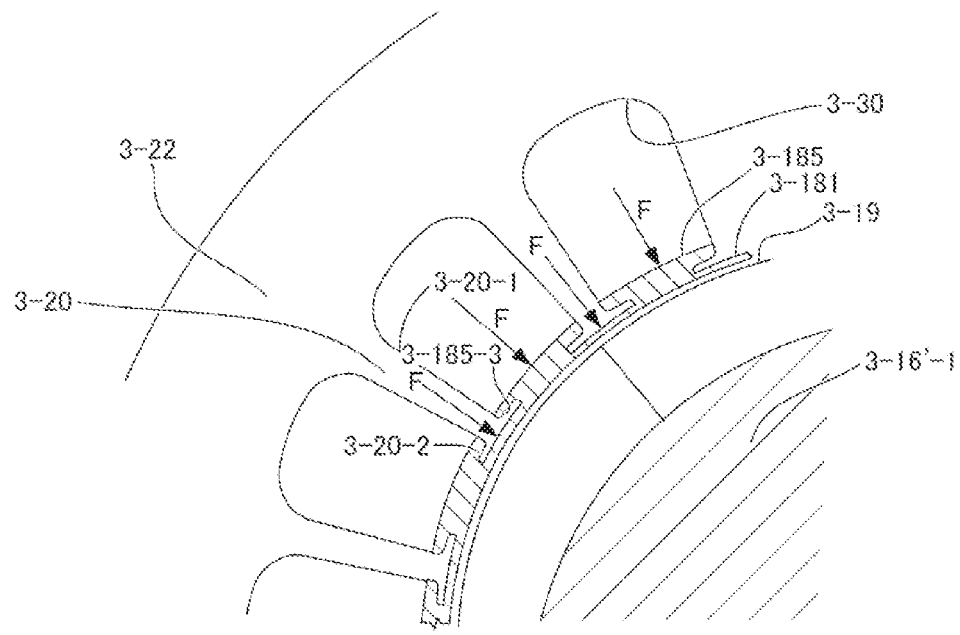
FIG. 12 is a partially enlarged view of FIG. 11.
Figure 13:
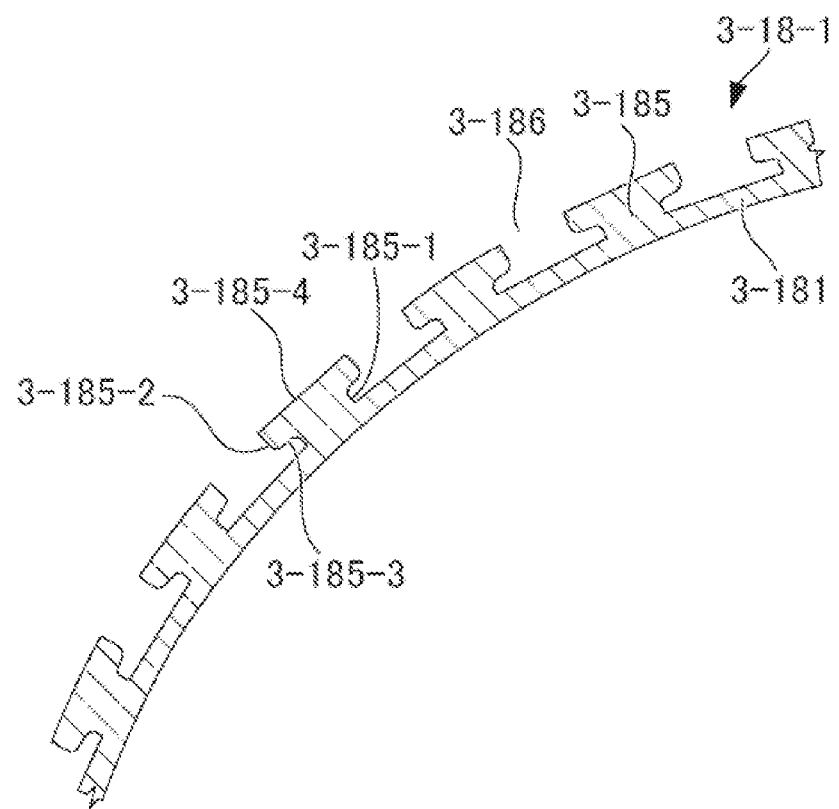
FIG. 13 is a partial sectional view illustrating the details of the partition.

Next, referring to FIGS. 12 and 13, an embodiment of the partition 3-18-1 is described in details. FIG. 12 is a partially enlarged view of FIG. 11. In FIG. 12, the illustration of the windings 3-21 is omitted. FIG. 13 is a diagram illustrating the partition 3-18-1 alone, and is a partial sectional view across a length direction of the barrel portion 3-181 of the partition 3-18-1.

Referring to FIG. 12, the distal end portion of each of the magnetic-pole tooth portions 3-20 of the stator 3-11 extends substantially in parallel to the permanent magnets 3-19 (in other words, in the circumferential direction) so as to increase a surface area opposed to the permanent magnets 3-19, thereby forming the extended portion 3-20-2 having a larger sectional area than that of each of the magnetic-pole base portions 3-20-1. Between the magnetic-pole tooth portions 3-20, the slots 3-30 in which the windings 3-21 (not shown) are respectively housed are formed. On the other hand, an outer circumferential portion of the partition 3-18-1 is configured so as to form the meshing portion which is radially brought into meshing engagement with the magnetic-pole tooth portions 3-20 in the respective slots 3-30. Specifically, projecting portions 3-185 which project outward in the radial direction of the partition 3-18-1 so as to correspond to the slots 3-30 are formed on the barrel portion 3-181 of the partition 3-18-1. As illustrated in FIG. 12, each of the projecting portions 3-185 has a complementary sectional shape to a distal end portion of corresponding one of the magnetic-pole tooth portions 3-20 so that the outer circumferential portion of the partition 3-18-1 is fitted to the distal end portions of the magnetic-pole tooth portions 3-20 (in other words, the outer circumferential portion of the partition 3-18-1 is held in close contact with the distal end portions of the magnetic-pole tooth portions 3-20). Specifically, as illustrated in the sectional view of FIG. 13, each of the projecting portions 3-185 includes a base portion 3-185-1 and an extended portion (in other words, expanded portion) 3-185-2. The base portion 3-185-1 projects from the barrel portion 3-181 in the radial direction, and has a small width (in other words, a size in the circumferential direction). The extended portion 3-185-2 extends from a distal end of the base portion 3-185-1 in the circumferential direction of the barrel portion 3-181, and has a large width. The extended portion 3-185-2 includes meshing surfaces 3-185-3 and a distal end surface 3-185-4. Each of the meshing surfaces 3-185-3 is provided opposite to the extended portions 3-20-2 in corresponding one of the slots 3-30 in the radial direction so as to mesh with the extended portion 3-20-2 of the magnetic-pole tooth portion 3-20 in the radial direction. The distal end surface 3-185-4 is flat, and is provided so as to be oriented to face the stator core 3-22. Grooves 3-186 into which the distal end portions of the magnetic-pole tooth portions 3-20 can fit are formed by the projecting portions 3-185 and parts of the outer surface of the barrel portion 3-181, which are located between the projecting portions 3-185. As described above, in this embodiment, the meshing portion is formed by the projecting portions 3-185 of the partition 3-18-1 and the parts of the outer surface of the barrel portion 3-181, which are located between the projecting portions 3-185.

When the pump P is rotationally driven by the canned motor M having the configuration described above, vacuum regions are formed in a pump casing 3-3 and rotor chambers 3-17-1 and 3-17-2. A large compressing force F in the radial direction as illustrated in FIG. 12 acts on the partition 3-18-1 defining the rotor chamber 3-17-1 and the partition 3-18-2 defining the rotor chamber 3-17-2 by a differential pressure between an atmospheric pressure around the motor M and a pressure in the vacuum regions (in other words, a large tensile force toward the interior of the rotor chambers 3-17-1 and 3-17-2 acts). In this embodiment, however, the outer circumferences of the partitions 3-18-1 and 3-18-2 form the meshing portions including the meshing surfaces 3-185-3 which mesh with the magnetic-pole tooth portions 3-20 of the stator 3-11 in the radial direction. Therefore, a part of the radial compressing force generated during the operation of the pump can be supported by the stator 3-11. Specifically, in the embodiment described above, a part of the compressing force is supported by the stator 3-11 through the meshing surfaces 3-185-3. Therefore, it is not necessary to support all the compressing force by the partitions 3-18-1 and 3-18-2 as in the conventional cases. Therefore, even when the thickness of each of the partitions 3-18-1 and 3-182-2 is formed smaller than that in the conventional cases, there is no fear of inward buckling distortion of the partitions 3-18-1 and 3-18-2, which is caused by the compressing force. Therefore, the thickness of the partitions 3-18-1 and 3-18-2 located in the magnetic gaps can be significantly reduced as compared with the conventional thickness. As a result, the magnetic gaps can be minimized to improve the motor efficiency.

Moreover, as in the embodiment described above, it is preferred that the sectional shape of the meshing portion including the meshing surfaces 3-185-3 be complementary to the distal end portions of the magnetic-pole tooth portions 3-20. Moreover, as illustrated in FIGS. 9 and 10, it is preferred that the meshing portion extend over the entire length of the partitions 3-18-1 and 3-18-2 to form the ribs. In this manner, for assembly of the motor M, the partitions 3-18-1 and 3-18-2 can be easily inserted into the stator 3-11 along the ribs so that the outer circumferential portions of the partitions 3-18-1 and 3-18-2 fit to the distal end portions of the magnetic-pole tooth portions 3-20. In this manner, the partitions 3-18-1 and 3-18-2 can be easily brought into close contact with the stator 3-11. Therefore, the gaps between the stator and the rotors can be minimized. In this regard, this embodiment can be advantageously applied to any pumps other than the vacuum pump. In another embodiment, the ribs formed by the meshing portion are not required to continuously extend over the entire length of the partition 3-18-1 (3-18-2) as illustrated in FIGS. 9 and 10. Alternatively, the ribs may extend intermittently over a plurality of sections. Further alternatively, the ribs may extend over a part of the entire length of the partition 3-18-1 (3-18-2).

Further, in this embodiment, the meshing portion is formed to have a specific radial size. As a result, the meshing portion can also function as a winding retaining portion for retaining the windings in the slots 3-30. An independent winding retaining member for retaining the winding in the slot of the stator, which is called "spacer", is conventionally used. The independent winding retaining member is generally a member obtained by processing a resin material as a non-metallic material into a strip. The winding retaining member is inserted into each of the slots and used to retain the winding in the slot so as to prevent the winding from being unwound. The winding is fixed by filling the slot with a resin after the completion of the motor. The spacer is required to retain the winding until a resin filling step is finished. In another embodiment, for example, by setting a thickness of the extended portion 3-185-2 of the projecting portion 3-185 of the embodiment described above to a specific thickness, the extended portion 3-185-2 may function as the winding remaining portion in place of the conventional spacer. The extended portion 3-185-2 is a portion provided in each of the slots 3-30, and therefore is not a portion located in the magnetic gap. Thus, even when the thickness of the extended portion 3-185-2 is increased, the motor efficiency is not affected thereby. With the configuration described above, the independent winding retaining member is not required to be used. Therefore, the number of components and the number of assembly steps of the canned motor can be significantly reduced.

Figure 14:
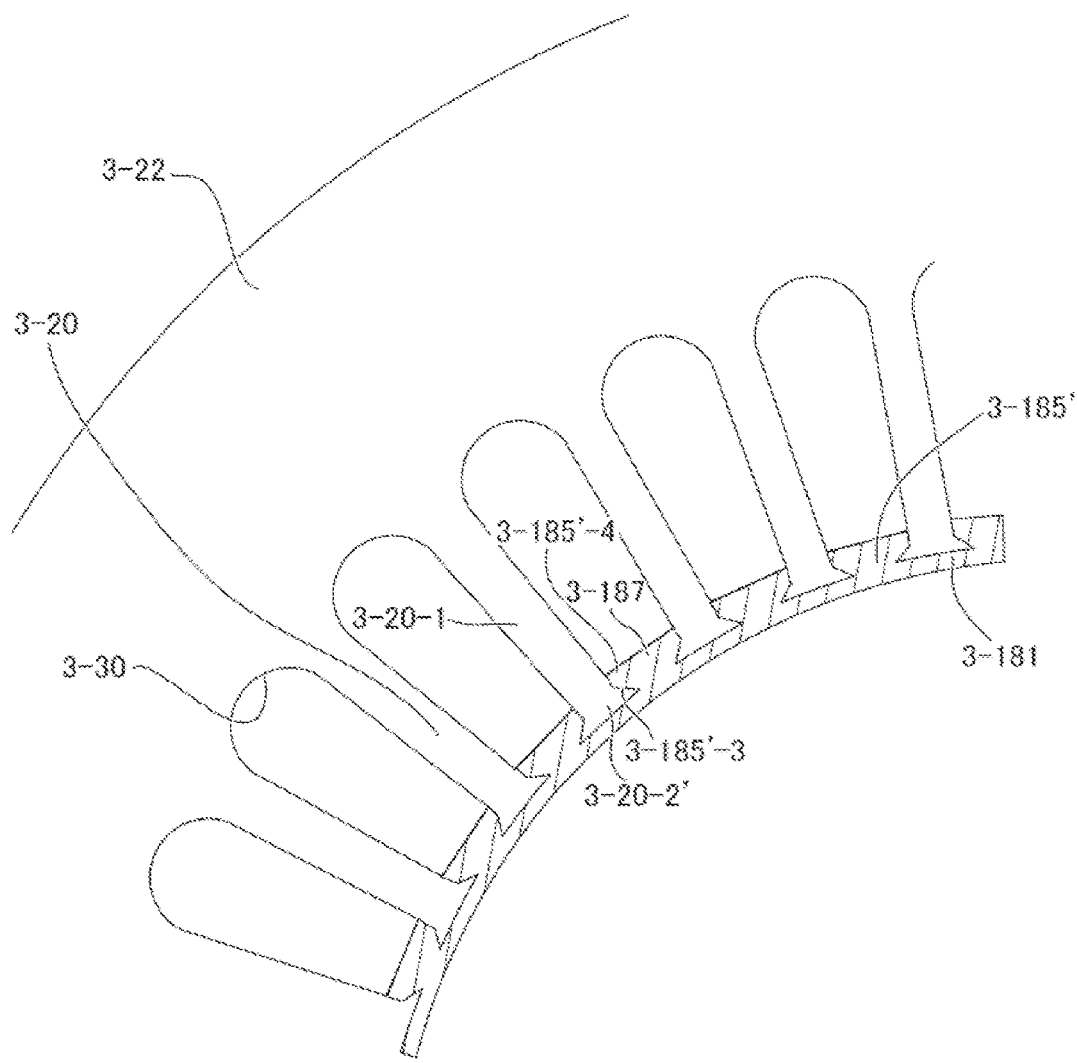
FIG. 14 is a partial sectional view illustrating another example of a meshing portion of the partition.

In the embodiment described above, the projecting portion 3-185 is formed to have an approximately T-like sectional shape. Such a T-like sectional shape is provided because the distal end portion of each of the magnetic-pole tooth portions 3-20 of this embodiment is formed to have an approximately inverted T-like shape. The sectional shape of each of the projecting portions constituting the meshing portion can be changed in accordance with the sectional shape of the distal end portion of each of the magnetic-pole portions 3-20 corresponding to the projecting portions. An example of a projecting portion 3-185' having another sectional shape is illustrated in FIG. 14. In this example, the distal end portion of the magnetic-pole tooth portion 3-20 forms an extended portion 3-20-2' having an approximately triangular sectional shape. Therefore, the projecting portion 3-185' includes an approximately inverse triangular portion including meshing surfaces 3-185'-3 and a distal end surface 3-185'-4. The meshing surfaces 3-185'-3 mesh with oblique sides of the approximately triangular shape of the extended portion 3-20-2'. The distal end surface 3-185'-4 is flat, and is provided so as to face the stator core 3-22. As in the embodiment described referring to FIGS. 12 and 13, a part of a force in the compressing direction, which acts on the partitions 3-18-1 and 3-18-2, can be supported by the stator 11 through the meshing surfaces 3-185'-3. Further, the projecting portion 3-185' includes a winding retaining portion 3-187 extending outward in the radial direction so as to be able to retain the winding (not shown) in corresponding one of the slots 3-30.

Figure 15:
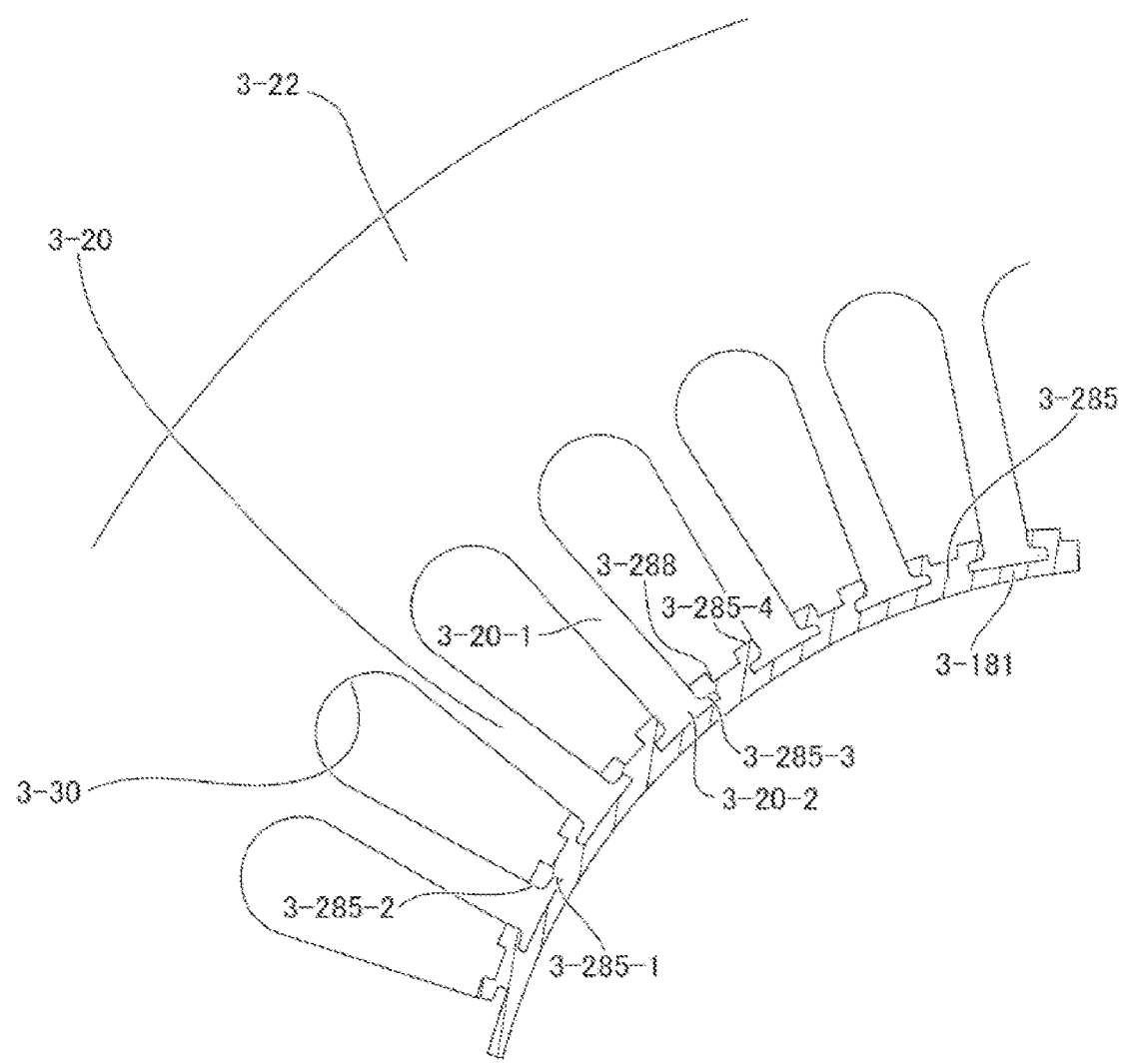
FIG. 15 is a partial sectional view illustrating a further example of the meshing portion of the partition.
Figure 16:
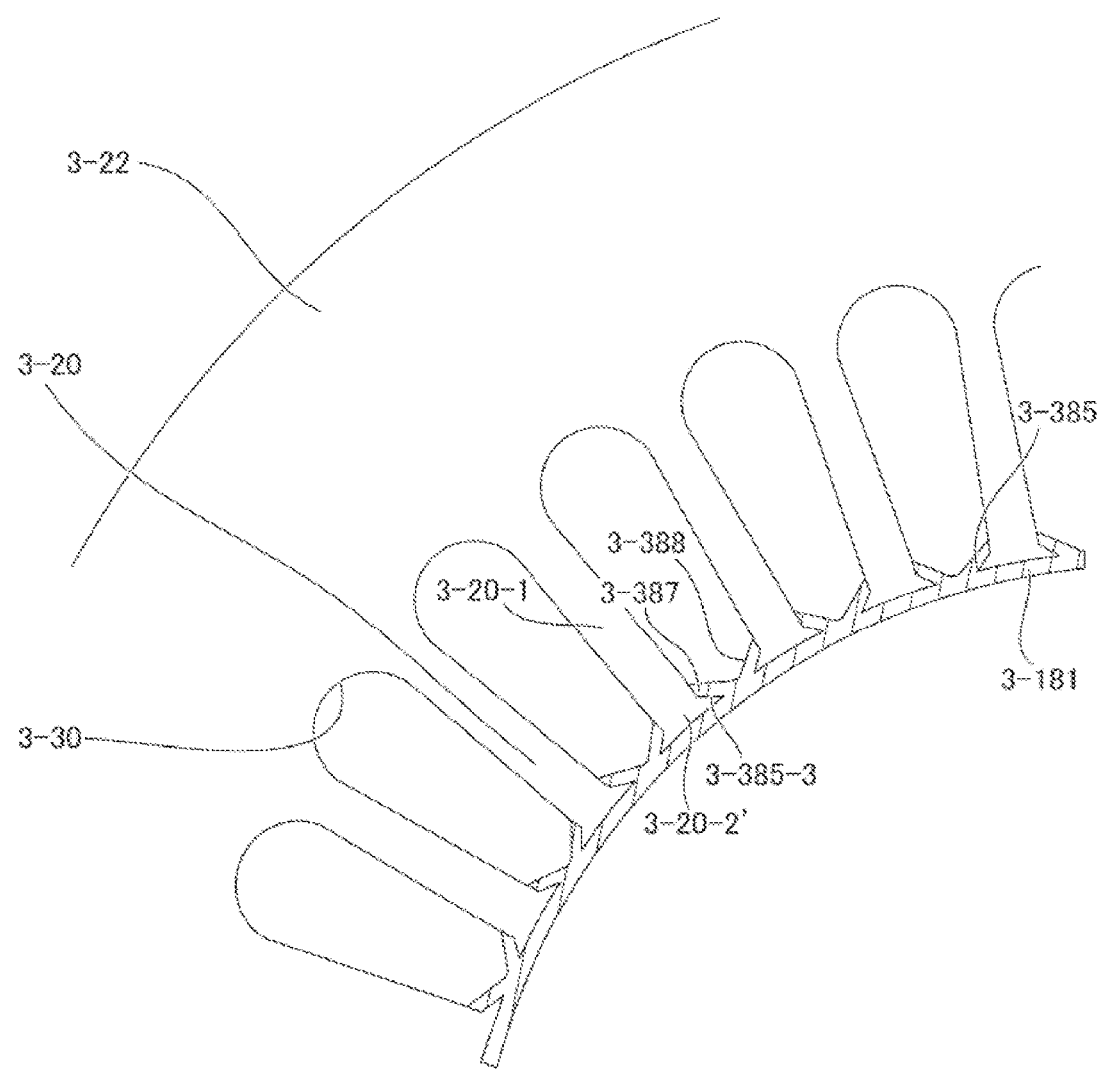
FIG. 16 is a partial sectional view illustrating a further example of the meshing portion of the partition.
Figure 17:
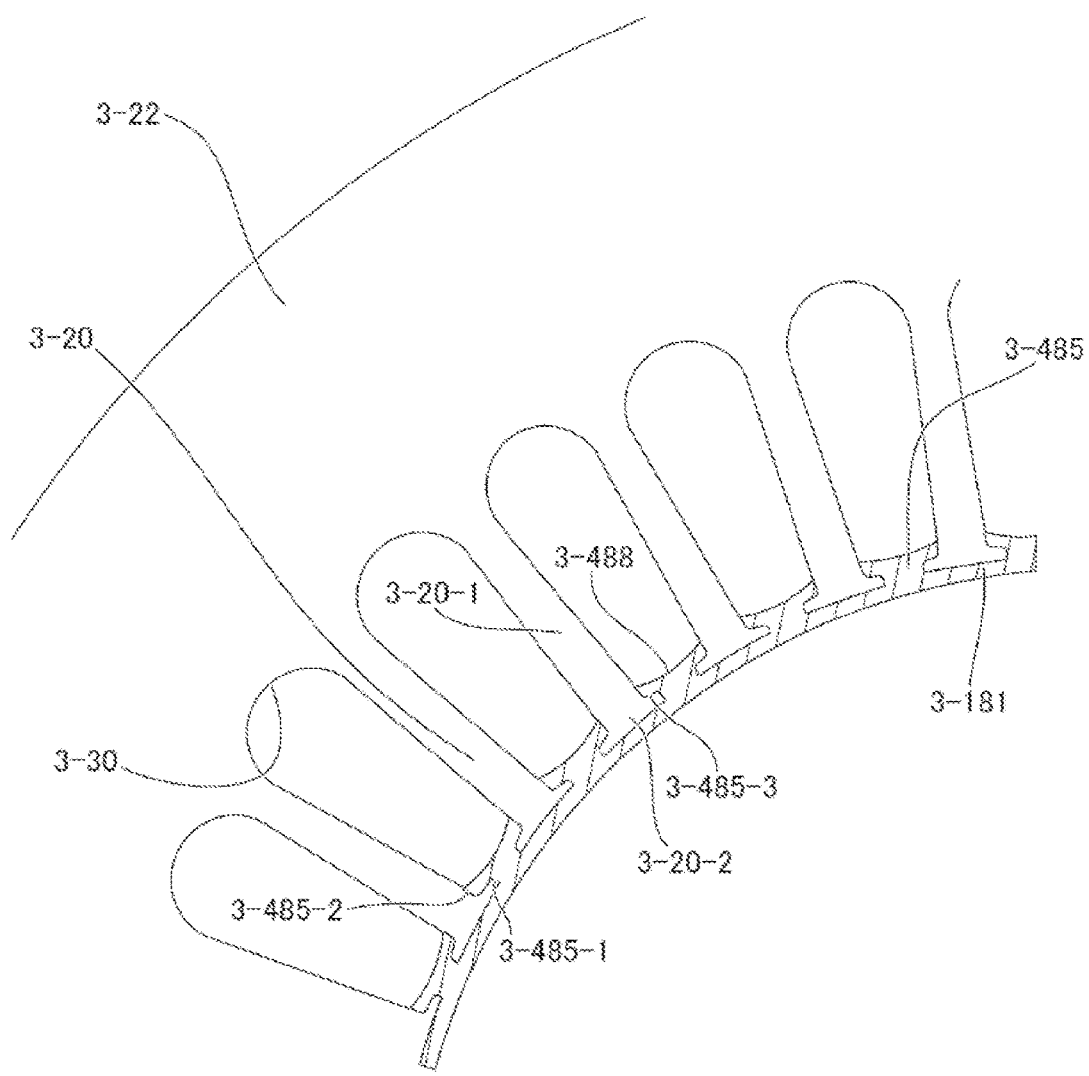
FIG. 17 is a partial sectional view illustrating a further example of the meshing portion of the partition.

FIGS. 15 to 17 illustrate further examples of the sectional shape of the meshing portion. In the embodiments described above, each of the distal end surface 3-185-4 of the projecting portion 3-185 and the distal end surface 3-185'-4 of the projecting portion 3-185' forms a flat surface. However, in the examples illustrated in FIGS. 15 to 17, the meshing portion includes a concave portion (in other words, a groove) which is open outward in the radial direction inside each of the slots 3-30. FIG. 15 illustrates an example of a projecting portion 3-285 having a rectangular groove 3-288 having a rectangular cross section formed on a distal end surface of a projecting portion having an approximately T-like cross section as illustrated in FIG. 13. Specifically, the rectangular groove 3-288 having the rectangular cross section is formed in an approximately central portion of a distal end surface 3-285-4 of the projecting portion 3-285 in the width direction. As in the embodiment described above, an extended portion 3-285-2 extending from a distal end of a base portion 3-285-1 of the projecting portion 3-285 in the width direction includes meshing surfaces 3-285-3 which are provided to face the extended portion 3-20-2 of the magnetic-pole tooth portion 3-20 inside the slot 3-30. The meshing surfaces 3-285-3 mesh with the extended portion 3-20-2 in the radial direction. As a result, a part of the force in the compressing direction can be supported by the stator 3-11. Further, in the example illustrated in FIG. 15, the rectangular groove 3-288 is formed on the distal end surface 3-285-4. Therefore, even when the extended portion 3-285-2 is provided inside the slot 3-30, the space inside the slot 3-30 can be maximally used as the winding retaining space. Thus, the motor efficiency can be improved.

FIG. 16 illustrates an example of a projecting portion 3-385 including a triangular groove (in other words, a V-shaped groove) 3-388 having an inverted triangular cross section formed on a distal end surface of a projecting portion of an approximately inverted triangular cross section as illustrated in FIG. 14. FIG. 17 illustrates an example of a projecting portion 3-485 including an arc-like groove 3-488 having an arc-like cross section formed on a distal end surface of a projecting portion having an approximately T-like cross section as illustrated in FIG. 13. Even in the examples illustrated in FIGS. 16 and 17, similarly to the example illustrated in FIG. 15, by forming the groove 3-388 on the distal end surface of the projecting portion 3-385 or the groove 3-488 on the distal end surface of the projecting portion 3-485, the space inside the slot 3-30 can be maximally used as the winding retaining space while the meshing engagement of the meshing surfaces 3-385-3 or 3-485-3 with the magnetic-pole tooth portions 3-20 in the radial direction is maintained. Therefore, the motor efficiency can be improved. In the examples illustrated in FIGS. 16 and 17, the concave portion 3-388 is formed on the distal end surface of the projecting portion 3-385 over the entire width direction, whereas the concave portion 3-488 is formed on the distal end surface of the projecting portion 3-485 over the entire width direction. Similarly to the example illustrated in FIG. 15, however, the concave portion 3-388 or 3-488 may be formed only on a part of the distal end surface.

This embodiment can be widely applied to the canned motors used for the pump, and can be suitably used for, in particular, the vacuum pump including the rotor chamber used under the reduced pressure atmosphere.

4. Fourth Embodiment Group

According to one embodiment of the present invention, a canned motor to be coupled to a vacuum pump and used as a rotary driving source for the vacuum pump is provided. The canned motor includes: a stator core; a rotor provided on an inner side of the stator core; and a can provided between the stator core and the rotor. The can is configured to separate the stator core and the rotor from each other. The can includes: a barrel portion having a hollow shape and extending in a direction of a rotation center axis line of the rotor; and an opening portion for forming an opening of the barrel portion on a first side directly coupled to the vacuum pump in the direction of the rotation center axis line. The stator core and the rotor are separated from each other in a hermetically sealed manner by the can and an O-ring provided on an outer surface of the opening portion of the can along a circumferential direction.

With the canned motor described above, the O-ring is provided on the outer surface of the can in the circumferential direction. Therefore, as compared with the case where the O-ring is provided on the second-side end surface of the can, a length of an overhang can be reduced by the amount of the space in which the O-ring is provided. In general, the vacuum pump is provided and assembled so that the direction of the rotation center axis line becomes the horizontal direction (direction perpendicular to the vertical direction). Assuming such an arrangement, the O-ring is mounted on the surface in the horizontal direction in this embodiment. Therefore, as compared with the case where the O-ring is mounted on the surface in the vertical direction, which is formed on the second-side end surface of the can, the O-ring is unlikely to be removed during the assembly of the vacuum pump. Therefore, the assembly of the vacuum pump is facilitated.

According to one embodiment of the present invention, the can may be formed of resin. The opening portion may be formed to have a flange shape, and a thickness of the flange shape in the direction perpendicular to the rotation center axis line may be larger than that of the barrel portion. In the embodiment described above, even when the thickness of the barrel portion is set as small as possible to reduce the distance between the rotor and the stator so as to improve the motor characteristics, a sufficient stiffness of the opening portion can be obtained. Therefore, the O-ring can be suitably compressed to be deformed to obtain good sealing performance.

According to one embodiment of the present invention, the can may be formed of resin. The opening portion may include a first part, a second part, and ribs. The first part is formed to extend from the barrel portion toward the outer side of the can in the direction crossing the direction of the rotation center axis line. The second part is formed to extend from the first part toward the first side. The ribs are formed between the first part and the second part. A thickness of each of the first part and the second part may be equal to or larger than the thickness of the barrel portion and equal to twice the thickness of the barrel portion or smaller. In the embodiment described above, even when the thickness of the barrel portion is reduced as much as possible to reduce the distance between the rotor and the stator, the opening portion is reinforced by the ribs to obtain a sufficient stiffness. Therefore, the O-ring can be suitably compressed to be deformed to obtain reliable sealing performance. In addition, the thickness of the can falls within a predetermined range regardless of the part of the can. Therefore, the can made of resin can be suitably manufactured by the injection molding. Further, in the injection molding, a molded product is left in inner molds when the molded product is demolded after the molding. In this embodiment, the molded product is more likely to be locked to the inner molds (male molds) by the ribs formed on the can. As a result, the manufacture of the can made of resin by the injection molding is facilitated.

According to one embodiment of the present invention, a level-difference portion formed by projecting the second side outward may be formed on the outer surface of the barrel portion along the circumferential direction. The can may be mounted in a state in which the level-difference portion and the stator core are held in contact with each other. In the embodiment described above, at the time of assembly of the canned motor, the can can be positioned in the direction of the rotation center axis line by the level-difference portion. Therefore, as compared with the case where a projecting portion projecting toward the inner diameter side is formed on a part of the inner surface of the hollow stator frame into which the stator core is to be fitted, and the end portion of the can on the second side is formed to have a flange-like shape, and the projecting portion and the flange-like shaped end portion of the can come into contact with each other to position the can in the direction of the rotation center axis line, the length of the overhang can be reduced by a length of the projecting portion.

According to one embodiment of the present invention, the can may include a closing portion for closing the internal space of the barrel portion on the second side opposite to the first side. In the embodiment described above, the interior of the can can be easily closely sealed to separate the stator core and the rotor from each other in a hermetically sealed manner.

According to one embodiment of the present invention, a vacuum pump is provided. The vacuum pump may include the canned motor in any one of the embodiments described above. Any combination of the various embodiments described above is possible.

Further, according to one embodiment of the present invention, a canned motor to be coupled to a pump and used as a rotary driving source for the pump is provided. The canned motor includes: a stator core; a rotor provided on an inner side of the stator core; and a can provided between the stator core and the rotor. The can is configured to separate the stator core and the rotor from each other. The can includes: a barrel portion having a hollow shape and extending in a direction of a rotation center axis line of the rotor; and an opening portion for forming an opening of the barrel portion on a first side directly coupled to the pump in the direction of the rotation center axis line. The stator core and the rotor are separated from each other in a hermetically sealed manner by the can and an O-ring provided on an outer surface of the opening portion of the can along a circumferential direction. The canned motor according to the embodiment described above can be applied to various types of pumps. For example, the canned motor according to the embodiment described above is applicable to liquid pumps and an air blower which is a kind of gas pumps in the broad sense of the term. Any combination of the canned motor according to this embodiment with the various embodiments described above applicable to the vacuum pump is possible. In the following, a fourth embodiment group of the present invention is described with the exemplification of more specific embodiments. Although the vacuum pump is described below as an example, embodiments described below are not limited to the vacuum pump as described above.

4-A. Embodiment 4-A

Figure 18:
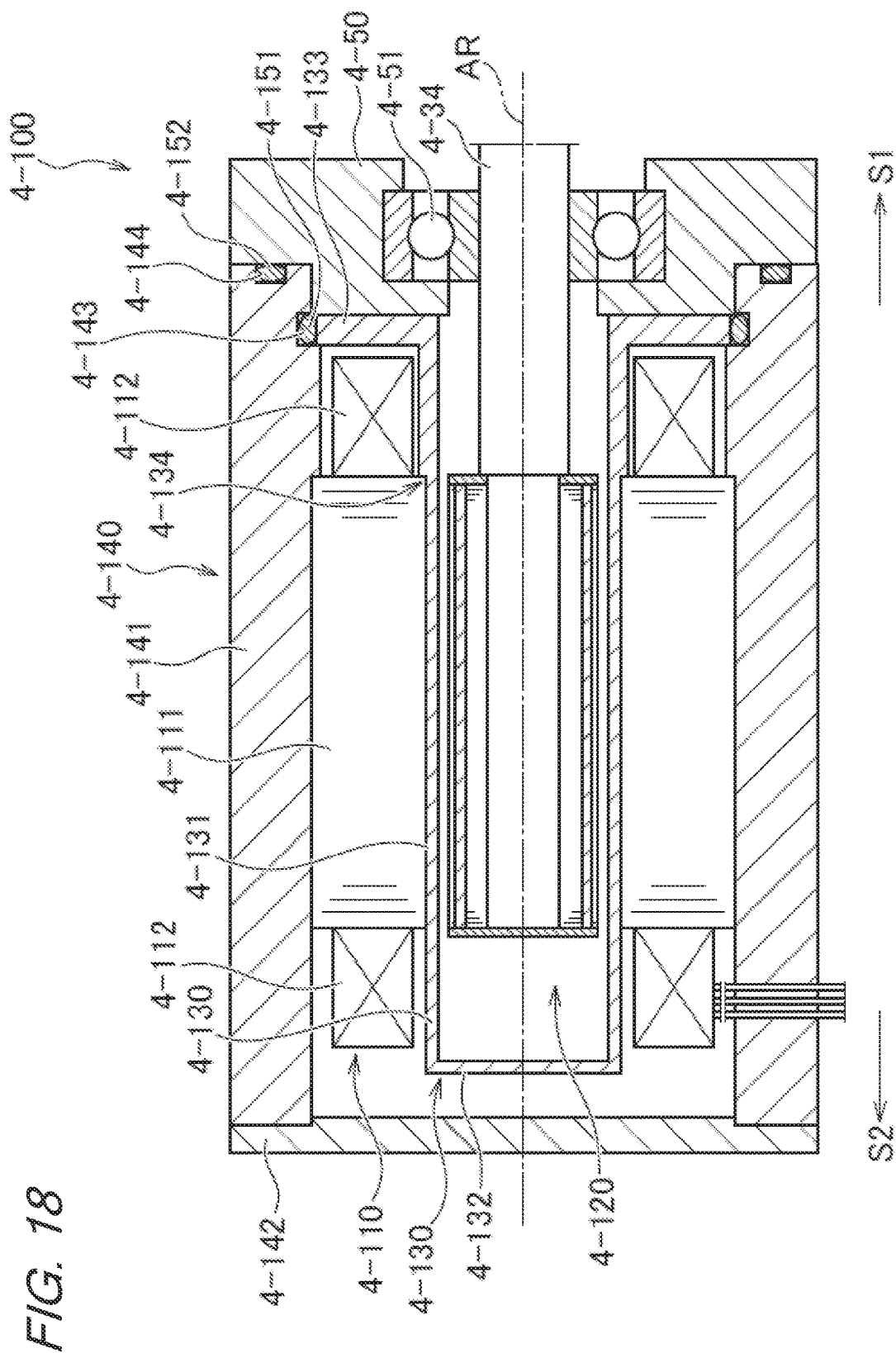
FIG. 18 is an explanatory view illustrating a schematic configuration of a canned motor according to Embodiment 4-A.

In Embodiment 4-A, an overall configuration of the vacuum pump 1-20 is the same as that of Embodiment 1-A. Therefore, points different from Embodiment 1-A are mainly described below. FIG. 18 illustrates a schematic configuration of a motor 4-100 which rotationally drives rotors 4-30. In the following description, a side of the motor 4-100 to be coupled to a vacuum pump 4-20 (more specifically, the rotors 4-30) in the direction of the rotation center axis line AR is also referred to as a coupling side S1, whereas a side opposite to the coupling side S1 is also referred to as an outer side S2. As illustrated in FIG. 18, the motor 4-100 includes a stator 4-110, a rotor 4-120, a can 4-130, and a stator frame 4-140.

The stator frame 4-140 includes a frame main body 4-141 and a side plate 4-142. The frame main body 4-141 has a cylindrical shape in which an internal space is formed along the rotation center axis line AR. The side plate 4-142 has a circular plate shape, and closes an opening of the frame main body 4-141 on the outer side S2. The stator 4-110, the rotor 4-120, and the can 4-130 are housed in the internal space of the stator frame 4-140.

The stator 4-110 has a configuration in which coils 4-112 are mounted to a stator core 4-111. By fitting the stator core 4-111 into the interior of the frame main body 4-141 of the stator frame 4-140, the stator 4-110 is fixed to the stator frame 4-140 coaxially with the rotation center axis line AR. The rotor 4-120 is provided coaxially with the rotation center axis line AR inside of the stator 4-110, and is directly coupled to a pump main shaft 4-34 of the rotor 4-30 of the vacuum pump 4-20.

The can 4-130 is provided between the stator 4-110 and the rotor 4-120 described above. The can 4-130 separates the stator 4-110 and the rotor 4-120 away from each other. The can 4-130 includes a barrel portion 4-131, a closing portion 4-132, and an opening portion 4-133. The barrel portion 4-131 has an approximately cylindrical shape, and is provided coaxially with the rotation center axis line AR. The barrel portion 4-131 is formed so as to extend over the range in which the stator 4-110 is provided in the direction of the rotation center axis line AR. On an outer surface of the barrel portion 4-131, a level-difference portion 4-134 formed by projecting outward a part of the outer surface on the coupling side S1 is formed along the circumferential direction. In this embodiment, the level-difference portion 4-134 is formed continuously in an annular shape. Specifically, a thickness of the barrel portion 4-131 becomes larger on the coupling side S1 of the level-difference portion 4-143 than on the outer side S2 of the level-difference portion 4-134. In another embodiment, the level-difference portion 4-134 may be projecting portions provided at spaced positions along the circumferential direction.

The closing portion 4-132 is an end surface of the can 4-130 on the outer side S2, and closes an internal space of the barrel portion 4-131 at the end portion of the barrel portion 4-131 on the outer side S2. The opening portion 4-133 is an end portion of the can 4-130 on the coupling side S1, and forms an opening of the can 4-130 on the coupling side S1. In this embodiment, the opening portion 4-133 has a flange-like shape having an outer diameter which is formed larger than that of the barrel portion 4-131. Therefore, a thickness of the opening portion 4-133 in the direction perpendicular to the rotation center axis line AR is larger than that of a part of the barrel portion 4-131 on the coupling side S1 of the level-difference portion 4-134, that of a part of the barrel portion 4-131 on the outer side S2 of the level-difference portion 4-134, and that of the closing portion 4-132.

In this embodiment, the can 4-130 is formed of resin. The barrel portion 4-131, the closing portion 4-132, and the opening portion 4-133 are formed integrally. A thickness of the barrel portion 4-131 can be set, for example, in a range from 1.5 mm to 2.0 mm. A thickness of the barrel portion 4-131 can be set small, for example, in a range from 0.5 mm to 1.0 mm. The can 4-130 is mounted so that the stator core 4-111 and a part of the barrel portion 4-131, which is located on the outer side S2 of the level-difference portion 4-134, are held in contact with each other in the circumferential direction. At this time, an end surface of the level-difference portion 4-134 is in a state in which the end surface is held in contact with the stator core 4-111. Specifically, the level-difference portion 4-134 has a function as means for positioning the can 4-130 in the direction of the rotation center axis line AR.

The motor 4-100 is mounted to the vacuum pump 4-20 by fixing the frame main body 4-141 of the stator frame 4-140 to a bearing member 4-50 with bolts (not shown). In FIG. 18, a cross section showing the mounting of the bolts is not illustrated. At this time, an end surface of the opening portion 4-133 of the can 4-130 on the coupling side S1 is held in contact with an end surface of the bearing member 4-50 on the outer side S2. Moreover, the stator 4-110 and the rotor 4-120 are separated from each other in a hermetically sealed manner by an O-ring 4-151 provided on an outer surface of the opening portion 4-133 of the can 4-130 in the circumferential direction. Specifically, a concave portion 4-143 is formed on an inner surface of the frame main body 4-141 of the stator frame 4-140 along the circumferential direction. In the concave portion 4-143, the O-ring 4-151 is provided. The O-ring 4-151 is compressed in a direction crossing (in this case, perpendicular to) the rotation center axis line AR between the opening portion 4-133 and the frame main body 4-141 so as to perform sealing between the stator 4-110 and the rotor 4-120.

Further, on an end surface of the frame main body 4-141 on the coupling side S1, a concave portion 4-144 is formed. An O-ring 4-152 is provided in the concave portion 4-144. The O-ring 4-152 is compressed in the direction of the rotation center axis line AR between the frame main body 4-141 and the bearing member 4-50 so as to perform sealing between the rotor 4-120 and the outer side of the motor 4-100.

Figure 19:
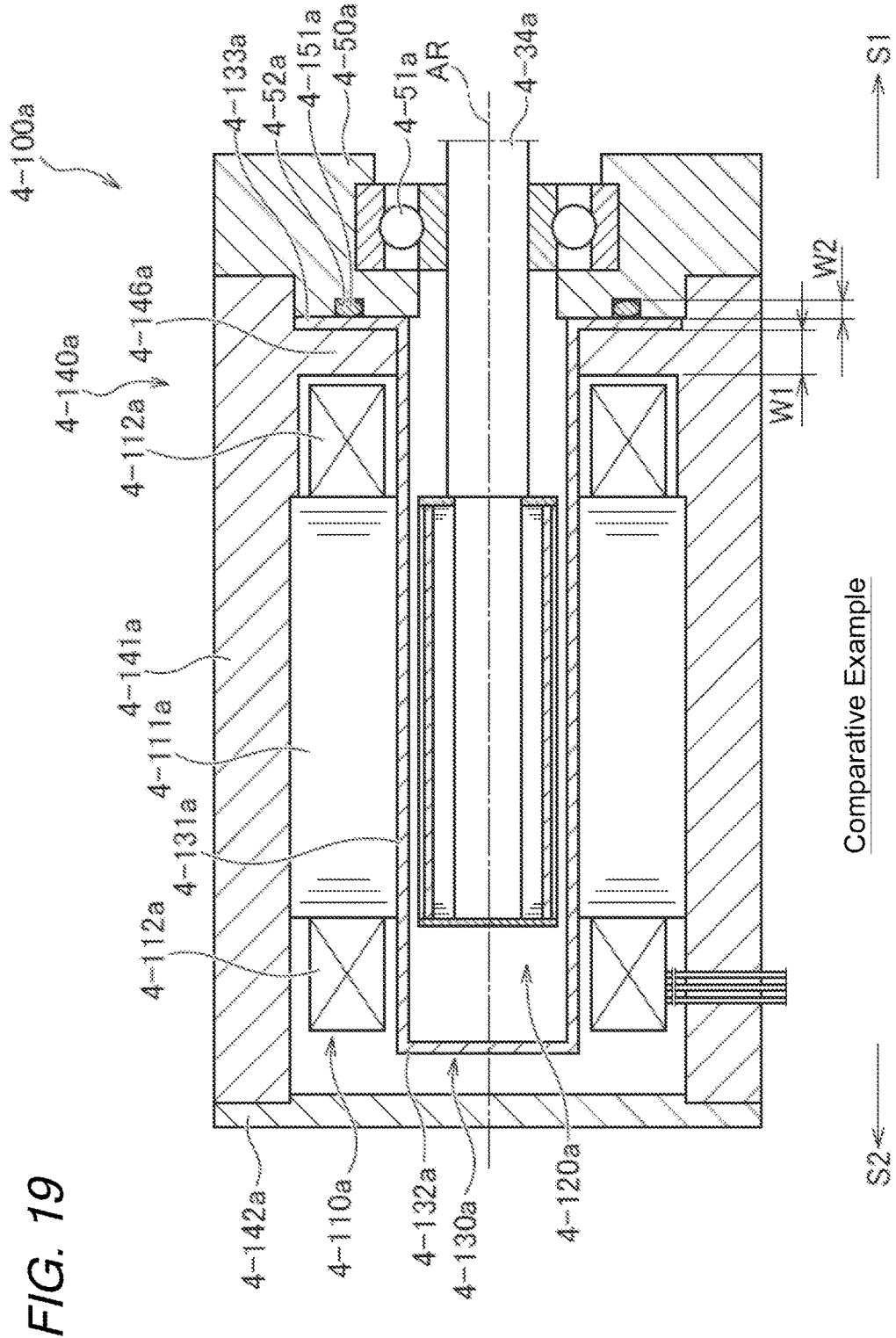
FIG. 19 is an explanatory view illustrating a schematic configuration of a canned motor according to a comparative example.

FIG. 19 illustrates a schematic configuration of a motor 4-100a as a comparative example. In FIG. 19, each of components of the motor 4-100a is denoted by a reference number with the letter "a" affixed to the end of the reference number denoting each of the components of the motor 4-100 as the embodiment. For the motor 4-100a, only points different from the motor 4-100 are described below.

The stator frame 4-140a includes a projecting portion 4-146a. The projecting portion 4-146a is a portion projecting inward from an inner surface of the frame main body 4-141a. The projecting portion 4-146a is formed in the vicinity of an end portion of the frame main body 4-141a on the coupling side S1. A length of projection of the projecting portion 4-146a is formed approximately equal to a length of the opening portion 4-133a. A width of the projecting portion 4-146a in the direction of the rotation center axis line AR is also referred to as a width W1. A barrel portion 4-131a of the can 4-130a has approximately the same thickness at any positions in the direction of the rotation center axis line AR. Specifically, the level-difference portion 4-134 provided to the motor 4-100 is not formed on the barrel portion 4-131a. Thus, the can 4-130a is positioned in the direction of the rotation center axis line AR by the contact of an end surface of the projecting portion 4-146a on the coupling side S1 and an end surface of the opening portion 4-133a on the outer side S2.

An annular concave portion 4-52a is formed in the circumferential direction on an end surface of a bearing member 4-50a on the outer side S2. A width of the concave portion 4-52a in the direction of the rotation center axis line AR is also referred to as a width W2. In the concave portion 4-52a, an O-ring 4-151a is provided. The O-ring 4-151a is compressed in the direction of the rotation center axis line AR between the opening portion 4-133a and the concave portion 4-52a to perform sealing between a stator 4-110a and a rotor 4-120a and between the rotor 4-120a and the exterior of the motor 4-100a. The motor 4-100a is pressed against the bearing member 4-50a in the direction of the rotation center axis line AR so as to be mounted thereto. Therefore, as illustrated in FIG. 19, in general, the O-ring 4-151a is provided so as to be compressed to be deformed in the direction of pressing, that is, in the direction of the rotation center axis line AR.

As is also apparent from the description given above, the projecting portion 4-146a is provided so as to position the can 4-130 in the direction of the rotation center axis line AR. Moreover, the projecting portion 4-146a also has a role of assisting in stiffness of the opening portion 4-133a when the opening portion 4-133a is formed to have a small thickness. Specifically, the projecting portion 4-146a provides a stiffness required to compress the O-ring 4-151*a* in the direction of the rotation center axis line AR to the opening portion 4-133*a*.

With the vacuum pump 4-20 described above, the O-ring 4-151 which performs sealing between the rotor 4-120 and the stator frame 4-140 is provided on the outer surface of the can 4-130 (opening portion 4-133) along the circumferential direction. Therefore, as compared with the case where the O-ring 4-151*a* is provided on the end surface of the can 4-130 (opening portion 4-133*a*) on the coupling side 51 as in the case of the motor 4-100*a*, a length of an overhang of the vacuum pump 4-20 can be reduced by the amount of a space in which the O-ring 4-151 is provided, that is, the width W2.

In addition, the vacuum pump 4-20 can position the motor 4-100 in the direction of the rotation center axis line AR by the level-difference portion 4-134 at the time of assembly of the motor 4-100. Therefore, as compared with the case where the projecting portion 4-146*a* is formed on the inner surface side of the stator frame 4-140*a* and the opening portion 4-133*a* of the can 4-130*a* is formed to have a flange-like shape so that the projecting portion 4-146*a* and the opening portion 4-133*a* are brought into contact with each other to position the can 4-130*a* in the direction of the rotation center axis line AR as in the case of the motor 4-100*a*, the length of the overhang of the vacuum pump 4-20 can be reduced by the amount of a space for the projecting portion 4-146*a*, that is, by the width W1.

Moreover, when the motor 4-100 is mounted to the vacuum pump 4-20 in a state in which the vacuum pump 4-20 is arranged horizontally, that is, the vacuum pump 4-20 is arranged so that the rotation center axis line AR extends along the horizontal direction, the O-ring 4-151 is mounted on a surface in the horizontal direction. Therefore, as compared with the case where the O-ring 4-151*a* is mounted to a surface in the vertical direction as in the case of the motor 4-100*a*, the O-ring 4-151 of the vacuum pump 4-20 can be prevented from being removed from the concave portion 4-143 to fall off in the middle of the assembly of the vacuum pump 4-20. As a result, the assembly of the vacuum pump 4-20 is facilitated.

Moreover, in the vacuum pump 4-20, the can 4-130 is formed of resin. The thickness of the opening portion 4-133 is larger than that of the barrel portion 4-131. Therefore, even when the distance between the rotor 4-120 and the stator 4-110 is reduced by reducing the thickness of the barrel portion 4-131 as much as possible so as to improve the motor efficiency, a sufficient stiffness of the opening portion 4-133 can be obtained. Therefore, the O-ring 4-151 can be suitably compressed to be deformed to obtain good sealing performance.

4-B: Embodiment 4-B

Figure 20:
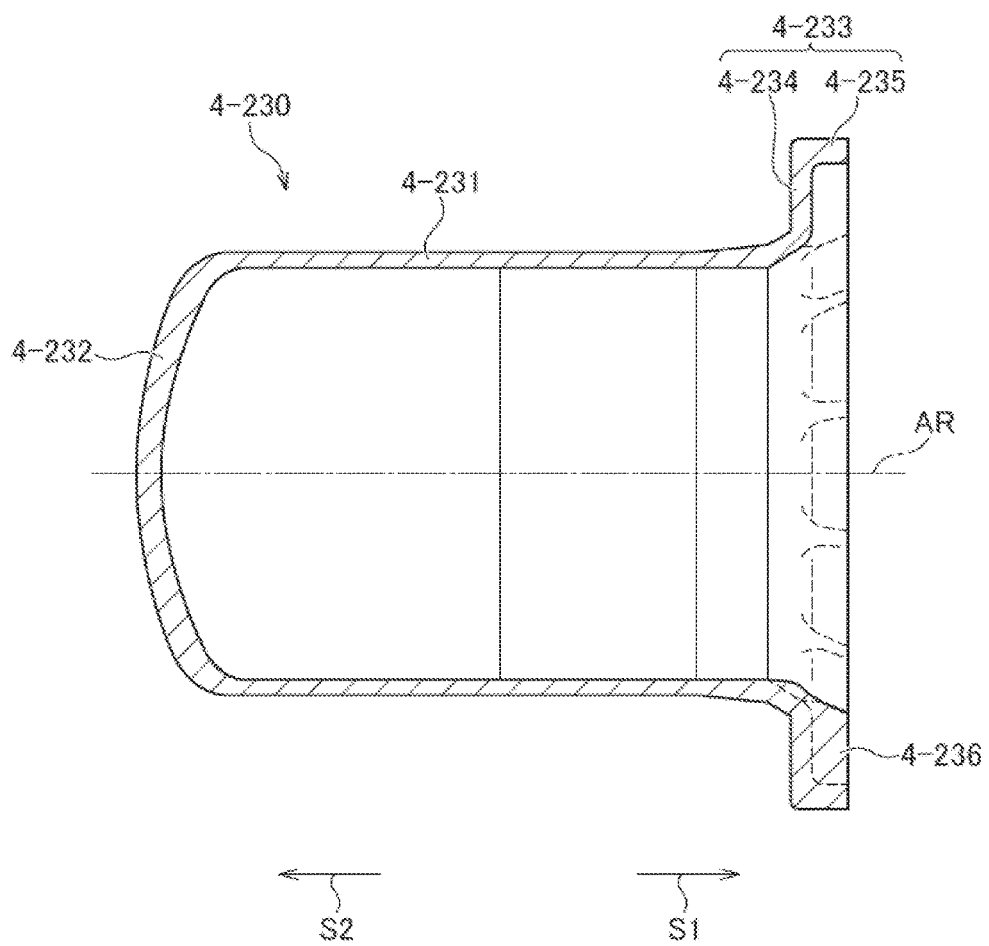
FIG. 20 is an explanatory view illustrating a configuration of a can of a canned motor according to Embodiment 4-B.
Figure 21:
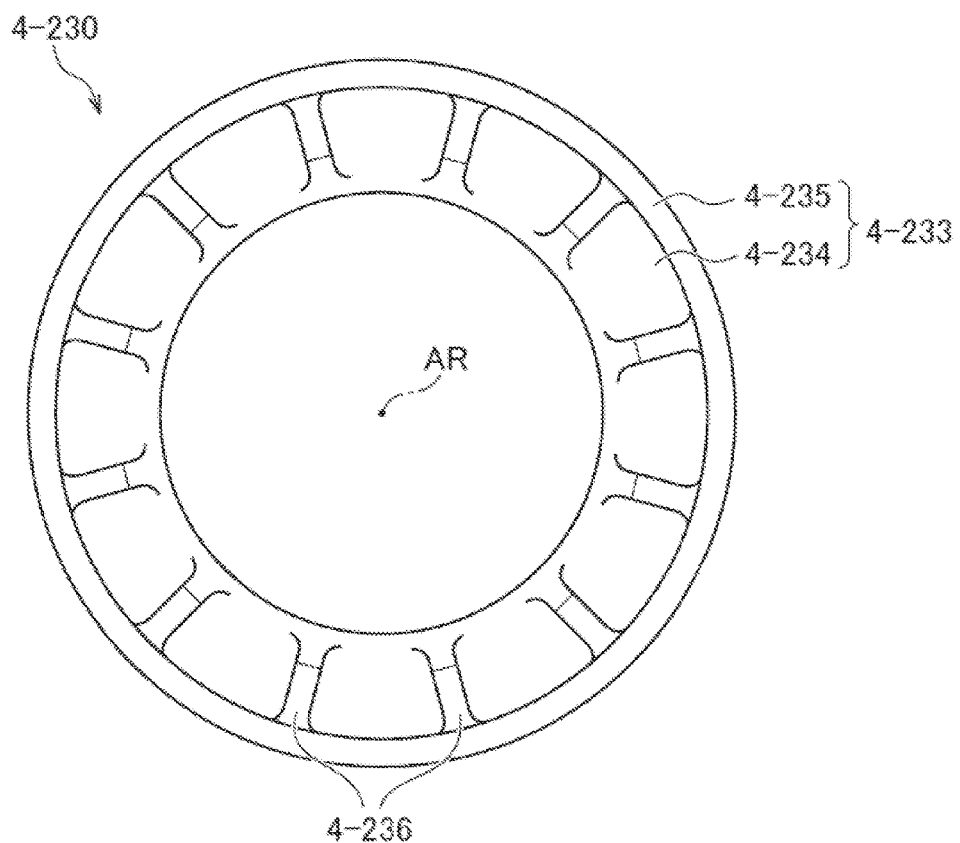
FIG. 21 is a diagram illustrating the can as viewed from an opening-portion side.

FIGS. 20 and 21 illustrate a configuration of a can 4-230 of a vacuum pump according to Embodiment 4-B. The vacuum pump according to Embodiment 4-B differs from that of Embodiment 4-A only in a part of the configuration of the can. The remaining points are the same as those of Embodiment 4-A. Therefore, for the can 4-230, only points different from Embodiment 4-A are described below. FIG. 20 is a partial sectional view of the can 4-230, corresponding to FIG. 18. FIG. 21 is a view of the can 4-230 as viewed from the coupling side 51.

Similarly to Embodiment 4-A, the can 4-230 includes a barrel portion 4-231, a closing portion 4-232, and an opening portion 4-233. A thickness of the closing portion 4-232 is formed slightly larger than that of the barrel portion 4-231. The closing portion 4-232 has an arc-like shape expanding to the outer side S2. The opening portion 4-233 includes a first part 4-234 and a second part 4-235. The first part 4-234 is formed to extend from the barrel portion 4-231 toward the outer side of the can 4-230 in the direction crossing (in this case, perpendicular to) the direction of the rotation center axis line AR. The second part 4-235 is formed to extend from the first part 4-234 to the coupling side 51. A thickness of each of the first part 4-234 and the second part 4-235 falls in the range of 100% to 200% with respect to a thickness of the barrel portion 4-231.

Ribs 4-236 are formed in the circumferential direction at spaced positions between the first part 4-234 and the second part 4-235 as illustrated in FIGS. 20 and 21. Each of the ribs 4-236 is formed from an inner end portion of a top surface of the second part 4-235 on the coupling side 51 to extend in the direction perpendicular to the rotation center axis line AR toward the rotation center axis line AR by about the same length as a length of the first part 4-234 in the direction perpendicular to the rotation center axis line AR. Each of the ribs 4-236 is also formed to have an inclination to form an acute angle with respect to the rotation center axis line AR so as to reach a base end portion of the first part 4-234 on the barrel portion 4-231 side. In the motor including the can 4-230 described above, the O-ring 4-151 described above is provided on the outer surface of the second part 4-235 of the opening portion 4-233.

With the can 4-230, the opening portion 4-233 is reinforced by the rib 4-236 so that a sufficient stiffness is obtained even when the thickness of the barrel portion 4-231 is reduced as small as possible. Therefore, the O-ring 4-151 can be suitably compressed to be deformed to obtain reliable sealing performance. In addition, the thickness of the can 4-130 falls within a predetermined range regardless of the part of the can 4-130. Therefore, the can 4-230 made of resin can be suitably manufactured by the injection molding. Further, in the injection molding, the molded product is left in the inner molds when the molded product is demolded after the molding. With the can 4-320, the ribs 4-236 are formed on the can 4-320, and hence the molded product is more likely to be locked to the inner molds. As a result, the manufacture of the can 4-230 made of resin by the injection molding is facilitated.

4-C. Variations

4-C-1. Variation 4-C-1

The opening portion 4-133 is not necessarily required to have the flange-like shape. For example, the opening portion 4-133 may be formed to have the same outer diameter as that of the barrel portion 4-131. Even in this case, the O-ring 4-151 may be provided between the opening portion 4-133 and the stator frame 4-140.

4-C-2. Variation 4-C-2

The O-ring 4-151 is not necessarily required to be provided between the frame main body 4-141 and the opening portion 4-133. For example, for some shape of an interfacing surface of the bearing portion 4-50 with the motor 4-100, the O-ring 4-151 may be provided between the bearing member 4-50 and the opening portion 4-133 so as to be compressed to be deformed in the direction perpendicular to the rotation center axis line AR.

4-C-3. Variation 4-C-3

The concave portion 4-143 for providing the O-ring 4-151 therein is not necessarily required to be formed on the frame main body 4-141. For example, a concave portion may be formed on the opening portion 4-133.

4-C-4. Variation 4-C-4

The material of the can 4-130 is not limited to resin, and various materials can be used for the can 4-130. For example, the material of the can 4-130 may be non-magnetic metal such as stainless steel. Even in this manner, the length of the overhang can be reduced as in Embodiments 4-A and 4-B.

4-C-5. Variation 4-C-5

The can 4-130 is not necessarily required to have the shape closed on the outer side S2. For example, the barrel portion 4-131 may be formed to further extend to the outer side S2 so as to be held in contact with the side plate 4-142 in a hermetically sealed manner.

The embodiments of the present invention have been described above. However, the above-mentioned embodiments of the present invention are given to facilitate the understanding of the present invention, and do not mean to limit the present invention. The present invention can be changed and modified without departing from the spirit thereof. In addition, it is apparent that equivalents are encompassed in the present invention. Moreover, the combination or the omission is possible for each of the components described in the claims and the specification within the range in which at least a part of the problems described above is solved or the range in which at least a part of the effects described above is obtained. For example, the configuration of Embodiment 1-C and that of Variation 1-F-1 can be actualized separately from the configurations of Embodiments 1-A and 1-B. For example, the configuration described above can be applied to a canned motor in which the stator core 1-111 and the barrel portion 1-131 are not bonded with the adhesive or a canned motor without the reinforcing member 1-150.

What is claimed is:

1. A canned motor to be coupled to a vacuum pump and used as a rotary driving source for the vacuum pump, the canned motor comprising:
   a stator core;
   a rotor provided on an inner side of the stator core; and
   a can provided between the stator core and the rotor, the can being configured to separate the stator core and the rotor from each other, the can including a barrel portion having a hollow shape and extending in a direction of a rotation center axis line of the rotor, and an opening portion for forming an opening of the barrel portion on a first side directly coupled to the vacuum pump in the direction of the rotation center axis line,
   wherein the opening portion is formed to have a flange shape including:
      a first part formed to extend from the barrel portion toward the outer side of the can in the direction crossing the direction of the rotation center axis line; and
      a second part formed to extend from the first part toward the first side,
   the opening portion includes ribs formed in the circumferential direction of the can at spaced positions between the first part and the second part,
   the stator core and the rotor are separated from each other in a hermetically sealed manner by the can and an O-ring, the O-ring provided on an outer surface of the second part of the opening portion of the can along a circumferential direction and compressed in the direction crossing the direction of the rotation center axis line,
   at least part of the ribs and the O-ring are provided on a line crossing the direction of the rotation center axis line, and
   the can is formed of resin, and a thickness of each of the first part and the second part is equal to or larger than the thickness of the barrel portion, and equal to or smaller than twice the thickness of the barrel portion.

2. The canned motor according to claim 1, wherein a level-difference portion formed by projecting the first side outward is formed on an outer surface of the barrel portion along the circumferential direction, and
   the can is mounted in a state in which the level-difference portion and the stator core are held in contact with each other.

3. The canned motor according to claim 1, wherein the can includes a closing portion for closing the internal space of the barrel portion on a second side opposite to the first side.

4. A vacuum pump comprising:
   the canned motor in claim 1.

* * * * *